(12) United States Patent
Koyanagi

(10) Patent No.: US 7,529,553 B2
(45) Date of Patent: May 5, 2009

(54) RECEIVED SIGNAL QUALITY DISPLAY METHOD AND RECEIVED SIGNAL QUALITY DISPLAY SYSTEM

(75) Inventor: Kenji Koyanagi, Tokyo (JP)

(73) Assignee: NEC Corporation, Tokyo (JP)

( * ) Notice: Subject to any disclaimer, the term of this patent is extended or adjusted under 35 U.S.C. 154(b) by 459 days.

(21) Appl. No.: 11/451,491

(22) Filed: Jun. 13, 2006

(65) Prior Publication Data

US 2006/0281415 A1 Dec. 14, 2006

(30) Foreign Application Priority Data

Jun. 14, 2005 (JP) ............... 2005-173674

(51) Int. Cl.
*H04Q 7/20* (2006.01)
*H04B 1/00* (2006.01)
(52) U.S. Cl. .................. 455/457; 455/67.7; 455/226.4
(58) Field of Classification Search ............. 455/67.11, 455/67.13, 67.7, 226.1, 226.2, 226.4, 414.2, 455/456.1, 457
See application file for complete search history.

(56) References Cited

U.S. PATENT DOCUMENTS 5,023,900 A * 6/1991 Tayloe et al. ............. 379/32.01
6,035,183 A * 3/2000 Todd et al. ............... 455/226.2
7,280,803 B2 * 10/2007 Nelson ..................... 455/67.11

FOREIGN PATENT DOCUMENTS

| JP | 03-016323 | 1/1991 |
|---|---|---|
| JP | 2002-223218 A | 8/2002 |
| JP | 2003-110486 A | 4/2003 |
| JP | 2003-152617 A | 5/2003 |
| JP | 2003-199158 A | 7/2003 |
| JP | 2004-187091 A | 7/2004 |
| JP | 2005-005803 A | 1/2005 |

* cited by examiner

*Primary Examiner*—Lee Nguyen
(74) *Attorney, Agent, or Firm*—Foley & Lardner LLP

(57) ABSTRACT

A base station receives a pilot signal and position information on each of a plurality of mobile stations from the each mobile station. An uplink pilot signal separating unit separates the pilot signal of the each mobile station. A received uplink signal quality calculating unit calculates received signal information on the each mobile station based on the pilot signal of the each mobile station. A position information extracting unit extracts the position information on the each mobile station. A propagation information generating unit generates map information representing the received signal quality at every location by making the position information on the each mobile station correspond to the received signal quality information on the each mobile station. The base station transmits the map information to the each mobile station, and the each mobile station displays the map information.

38 Claims, 18 Drawing Sheets

RECEIVED SIGNAL QUALITY DISPLAY METHOD AND RECEIVED SIGNAL QUALITY DISPLAY SYSTEM

BACKGROUND OF THE INVENTION

1. Field of the Invention

The present invention relates to a method and a system for displaying a quality of a received signal in a wireless transmission system.

2. Description of the Related Art

As a method for displaying a quality of a received signal in a mobile station, there is known a method for displaying a level corresponding to a received signal power on a terminal screen (see, for example, Patent Literature 1). This display method will be described with reference to FIGS. 22 and 23.

In a base station transmitting apparatus 2200, a downlink pilot signal generating unit 2201 generates a downlink pilot signal $S_{BTP}$. A modulator 2202 modulates the downlink pilot signal $S_{BTP}$ and outputs a base station transmitted signal $S_{BTX}$. The base station transmitted signal $S_{BTX}$ is transmitted from a transmitting antenna 2203 to the mobile station.

In a mobile station receiving apparatus 2300, a receiving antenna 2301 receives the signal from the base station transmitting apparatus 2200, and outputs a mobile station received signal $S_{MA}$. A demodulator 2302 demodulates the mobile station received signal $S_{MA}$, and outputs a mobile station demodulated signal $S_{MDEM}$. A received downlink signal quality calculating unit 2303 calculates the received signal power based on the mobile station demodulated signal $S_{MDEM}$, and outputs received downlink signal quality information $S_{MR}$. A propagation information display unit 2304 inputs the received downlink signal quality information $S_{MR}$, and displays the level corresponding to the received downlink signal quality information $S_{MR}$ on a terminal screen.

A user who owns a mobile station terminal can easily confirm the received signal quality displayed on the terminal screen. If the received signal quality at the mobile station is poor, the user can improve the received signal quality by moving the mobile station terminal to another location or adjusting a receiving antenna of the terminal.

Patent Literature 1: Japanese Patent Application Laid-Open No. 3-16323

This conventional method has, however, the following disadvantages. A location for attaining a good received signal quality is not provided at the mobile station in advance. Due to this, if the mobile station is moved to the location for providing the good received signal quality, it is necessary to look for a new location while always confirming the received signal quality.

SUMMARY OF THE INVENTION

It is an object of the present invention to provide a received signal quality display method and a received signal quality display system capable of easily recognizing a location for providing a good received signal quality.

According to a first aspect of the present invention, there is provided a received signal quality display method comprising steps of: causing each of a plurality of mobile stations to transmit an uplink pilot signal and position information that indicates a position at which the each mobile station is present to a base station; causing the base station to receive the uplink pilot signal and the position information from the each mobile station; causing the base station to calculate received uplink signal quality information based on the uplink pilot signal received from the each mobile station; causing the base station to generate quality-position correspondence information on the plurality of mobile stations by making the received uplink signal quality information on the each mobile station correspond to the position information received from the each mobile station; causing the base station to transmit the quality-position correspondence information to the each mobile station; and causing the each mobile station to display an image generated based on the quality-position correspondence information.

The received signal quality display method according to the first aspect of the present invention may further comprise steps of: causing the each mobile station to transmit a mobile station identification number for identifying the each mobile station to the base station; causing the base station to generate an uplink pilot control signal, in which a correspondence between the each mobile station and a pattern of an uplink pilot signal to be transmitted by the each mobile station is described, based on the mobile station identification number received from the each mobile station; and causing the base station to transmit the uplink pilot control signal to the each mobile station, and at the step of causing the each mobile station to transmit the uplink pilot signal and the position information indicating the position at which the each mobile station is present to the base station, the each mobile station may transmit, as the uplink pilot signal, the uplink pilot signal having the pattern designated by the uplink pilot control signal to the base station.

The received signal quality display method according to the first aspect of the present invention may further comprise a step of causing the each mobile station to generate map information on a plurality of positions based on the quality-position correspondence information, the map information representing a correspondence between each of the plurality of positions and the received uplink signal quality, and at the step of causing the each mobile station to display the image generated based on the quality-position correspondence information, the each mobile station may display, as the image, an image representing the map information.

The received signal quality display method according to the first aspect of the present invention may further comprise a step of causing the each mobile station to generate map information representing a correspondence between a position and the received uplink signal quality for the position indicated by the map information included in the quality-position correspondence information at each of a plurality of times, and at the step of causing the each mobile station to display the image generated based on the quality-position correspondence information, the each mobile station may display, as the image, an image representing the map information.

The received signal quality display method according to the first aspect of the present invention may further comprise a step of causing the each mobile station to generate proximate location information indicating a most proximate location to a present position among locations at which a received uplink signal quality represented by the received uplink signal quality information exceeds a predetermined quality, based on the quality-position correspondence information, and at the step of causing the each mobile station to display the image generated based on the quality-position correspondence information, the each mobile station may display, as the image, an image representing the proximate location information.

In the received signal quality display method according to the first aspect of the present invention, at the step of causing the base station to calculate the received uplink signal quality information based on the uplink pilot signal received from the each mobile station, the base station may calculate, as the received uplink signal quality information, at least one of a received signal power in the base station for the each mobile station and a ratio of the received signal power to an interference power in the base station for the each mobile station.

In the received signal quality display method according to the first aspect of the present invention, at the step of causing the each mobile station to transmit the uplink pilot signal and the position information to the base station, the each mobile station may transmit the uplink pilot signal and the position information to the base station using a plurality of transmitting antennas based on a multiple-input/multiple-output transmission technique, at the step of causing the base station to receive the uplink pilot signal and the position information from the each mobile station, the base station may receive the uplink pilot signal and the position information using a plurality of receiving antennas based on the multiple-input/multiple-output transmission technique, and the uplink pilot signal used at the step of causing the base station to calculate the received uplink signal quality information based on the uplink pilot signal received from the each mobile station may be a plurality of uplink pilot signals for the each mobile station.

In the received signal quality display method according to the first aspect of the present invention, at the step of causing the base station to calculate the received uplink signal quality information based on the uplink pilot signals received from the each mobile station, the base station may calculate, as the received uplink signal quality information, at least one of the received signal power in the base station for the each mobile station, the ratio of the received signal power to the interference power in the base station for the each mobile station, a value calculated based on propagation path correlations among the each mobile station and the mobile stations other than the each mobile station for the each mobile station, and correlations among the transmitting antennas in the each mobile station.

In the received signal quality display method according to the first aspect of the present invention, at the step of causing the base station to calculate the received uplink signal quality information based on the uplink pilot signals received from the each mobile station, the base station may calculate, as the received uplink signal quality information, the received signal power in the base station for the each mobile station or the ratio of the received signal power to the interference power in the base station for the each mobile station, and correlations among the plurality of mobile stations, the method may further comprise a step of causing the base station to generate improvement location information for notifying one of the mobile stations in which the received signal power or the ratio of the received signal power to the interference power is relatively low as compared with the mobile stations other than the one mobile station, of a location at which the correlation is improved based on the quality-position correspondence information, and at the step of causing the each mobile station to display the image generated based on the quality-position correspondence information, the each mobile station may display, as the image, an image representing the improvement location information.

In the received signal quality display method according to the first aspect of the present invention, at the step of causing the base station to calculate the received uplink signal quality information based on the uplink pilot signals received from the each mobile station, the base station may calculate, as the received uplink signal quality information, the received signal power in the base station for the each mobile station or the ratio of the received signal power to the interference power in the base station for the each mobile station, and correlations among the plurality of mobile stations, the method may further comprise a step of causing the base station to generate improvement location information for notifying one of the mobile stations in which the received signal power or the ratio of the received signal power to the interference power is relatively low as compared with the mobile stations other than the one mobile station, of a location farthest from the each mobile station in an area in which the received signal power or the ratio of the received signal power to the interference power is equal to or higher than a predetermined value based on the quality-position correspondence information, and at the step of causing the each mobile station to display the image generated based on the quality-position correspondence information, the each mobile station may display, as the image, an image representing the improvement location information.

According to a second aspect of the present invention, there is provided a received signal quality display method comprising steps of: causing a base station to transmit a downlink pilot signal to each of a plurality of mobile stations; causing the each mobile station to receive the downlink pilot signal from the base station; causing the each mobile station to calculate received downlink signal quality information based on the downlink pilot signal received from the base station; causing the each mobile station to transmit the received downlink signal quality information and position information indicating a position at which the each mobile station is present to the base station; causing the base station to generate quality-position correspondence information on the plurality of mobile stations by making the received downlink signal quality information received from the each mobile station correspond to the position information received from the each mobile station; causing the base station to transmit the quality-position correspondence information to the each mobile station; and causing the each mobile station to display an image generated based on the quality-position correspondence information.

The received signal quality display method according to the second aspect of the present invention may further comprise a step of causing the each mobile station to generate map information on a plurality of positions based on the quality-position correspondence information, the map information representing a correspondence between each of the plurality of positions and the received downlink signal quality, and at the step of causing the each mobile station to display the image generated based on the quality-position correspondence information, the each mobile station may display, as the image, an image representing the map information.

The received signal quality display method according to the second aspect of the present invention may further comprise a step of causing the each mobile station to generate map information on a position indicated by the map information included in the quality-position correspondence information at each of a plurality of times, the map information representing a correspondence between the position and the received downlink signal quality, and at the step of causing the each mobile station to display the image generated based on the quality-position correspondence information, the each mobile station may display, as the image, an image representing the map information.

The received signal quality display method according to the second aspect of the present invention may further comprise a step of causing the each mobile station to generate proximate location information indicating a most proximate location to a present position among locations at which a received downlink signal quality represented by the received downlink signal quality information exceeds a predetermined quality, based on the quality-position correspondence information, and at the step of causing the each mobile station to display the image generated based on the quality-position correspondence information, the each mobile station may display, as the image, an image representing the proximate location information.

In the received signal quality display method according to the second aspect of the present invention, at the step of causing the each mobile station to calculate the received downlink signal quality information based on the downlink pilot signal received from the base station, the each mobile station may calculate, as the received downlink signal quality information, at least one of a received signal power in the each mobile station for the each mobile station and a ratio of the received signal power to an interference power in the each mobile station for the each mobile station.

In the received signal quality display method according to the second aspect of the present invention, at the step of causing the base station to transmit the downlink pilot signal to the each mobile station, the base station may transmit the downlink pilot signal to the each mobile station using a plurality of transmitting antennas based on a multiple-input/multiple-output transmission technique, at the step of causing the each mobile station to receive the downlink pilot signal from the base station, the each mobile station may receive the downlink pilot signal using a plurality of receiving antennas based on the multiple-input/multiple-output transmission technique, and the downlink pilot signal used at the step of causing the each mobile station to calculate the received downlink signal quality information based on the downlink pilot signal received from the base station may be a plurality of downlink pilot signals.

In the received signal quality display method according to the second aspect of the present invention, at the step of causing the each mobile station to calculate the received downlink signal quality information based on the downlink pilot signals received from the base station, the each mobile station may calculate, as the received downlink signal quality information, at least one of the received signal power in the each mobile station for the each mobile station, the ratio of the received signal power to the interference power in the each mobile station for the each mobile station, and correlations among the transmitting antennas in the base station.

In the received signal quality display method according to the second aspect of the present invention, at the step of causing the each mobile station to calculate the received downlink signal quality information based on the downlink pilot signals received from the base station, the each mobile station may calculate, as the received downlink signal quality information, the received signal power in the each mobile station for the each mobile station or the ratio of the received signal power to the interference power in the each mobile station for the each mobile station, and correlations among the plurality of mobile stations, the method may further comprise a step of causing the base station to generate improvement location information for notifying one of the mobile stations in which the received signal power or the ratio of the received signal power to the interference power is relatively low as compared with the mobile stations other than the one mobile station, of a location at which the correlation is improved based on the quality-position correspondence information, and at the step of causing the each mobile station to display the image generated based on the quality-position correspondence information, the each mobile station may display, as the image, an image representing the improvement location information.

In the received signal quality display method according to the second aspect of the present invention, at the step of causing the each mobile station to calculate the received downlink signal quality information based on the downlink pilot signals received from the base station, the each mobile station may calculate, as the received downlink signal quality information, the received signal power in the each mobile station for the each mobile station or the ratio of the received signal power to the interference power in the each mobile station for the each mobile station, and correlations among the plurality of mobile stations, the method may further comprise a step of causing the base station to generate improvement location information for notifying one of the mobile stations in which the received signal power or the ratio of the received signal power to the interference power is relatively low as compared with the mobile stations other than the one mobile station, of a location farthest from the each mobile station in an area in which the received signal power or the ratio of the received signal power to the interference power is equal to or higher than a predetermined value based on the quality-position correspondence information, and at the step of causing the each mobile station to display the image generated based on the quality-position correspondence information, the each mobile station may display, as the image, an image representing the improvement location information.

According to the present invention, the base station provides each mobile station with the information having positions of a plurality of mobile stations correspond to received signal qualities at the respective positions in advance. Each mobile station can, therefore, recognize a location for efficiently providing a good received signal quality.

DESCRIPTION OF THE PREFERRED EMBODIMENTS

Preferred embodiments of the present invention will be described hereinafter with reference to the accompanying drawings.

First Embodiment

Figure 1:
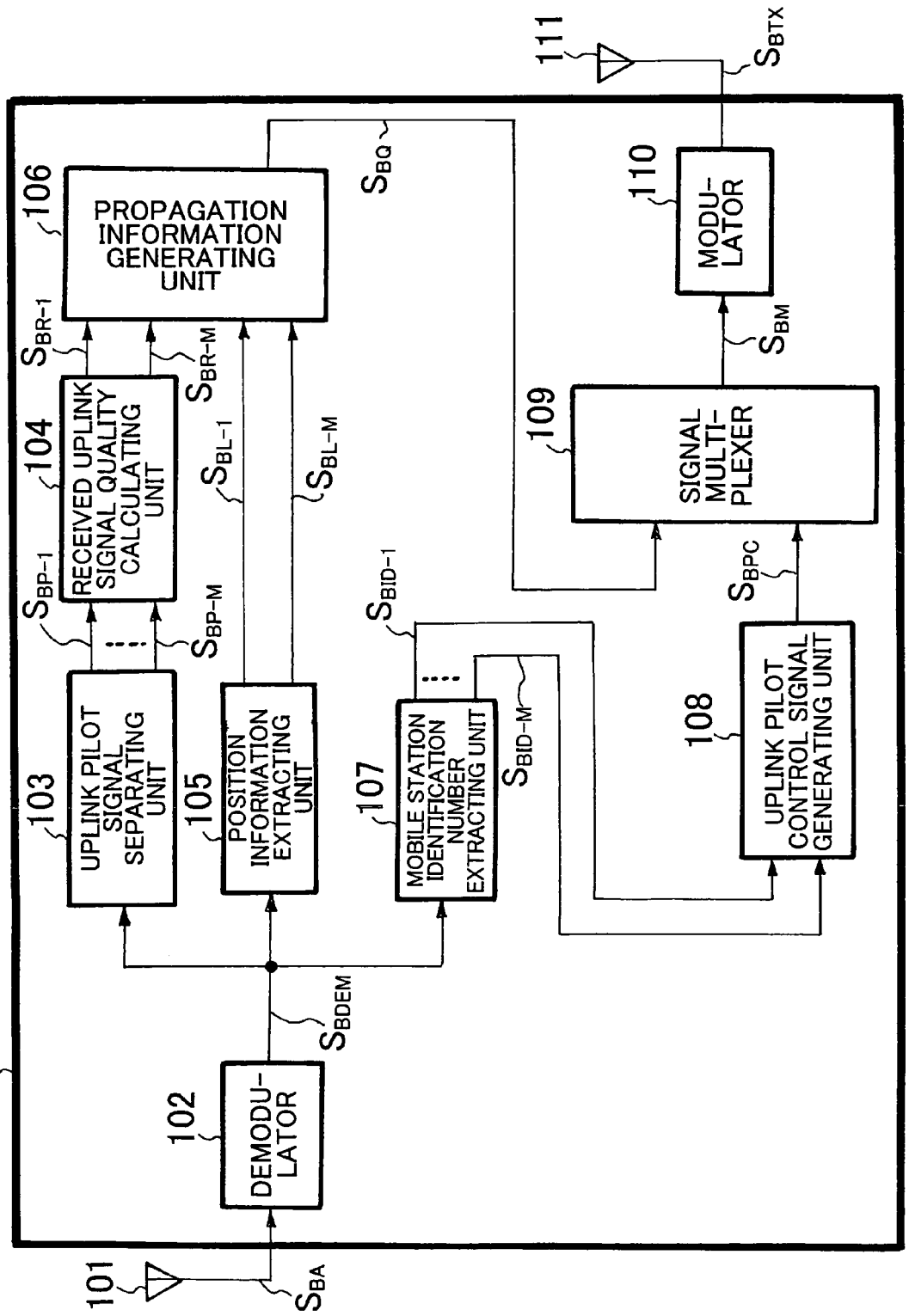
FIG. 1 is a block diagram of a configuration of a base station according to a first embodiment of the present invention.
Figure 2:
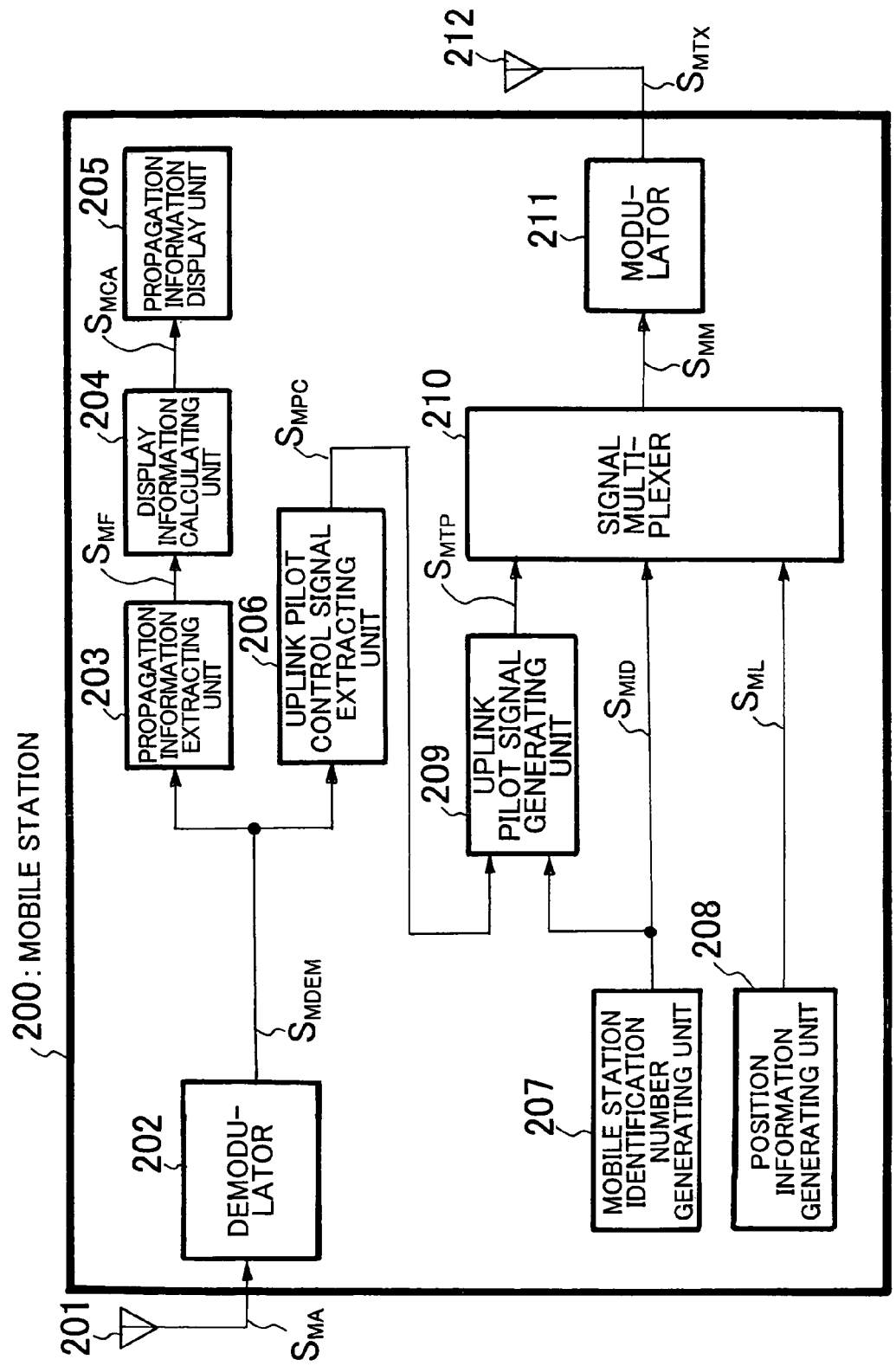
FIG. 2 is a block diagram of a configuration of a mobile station according to the first embodiment.
Figure 3:
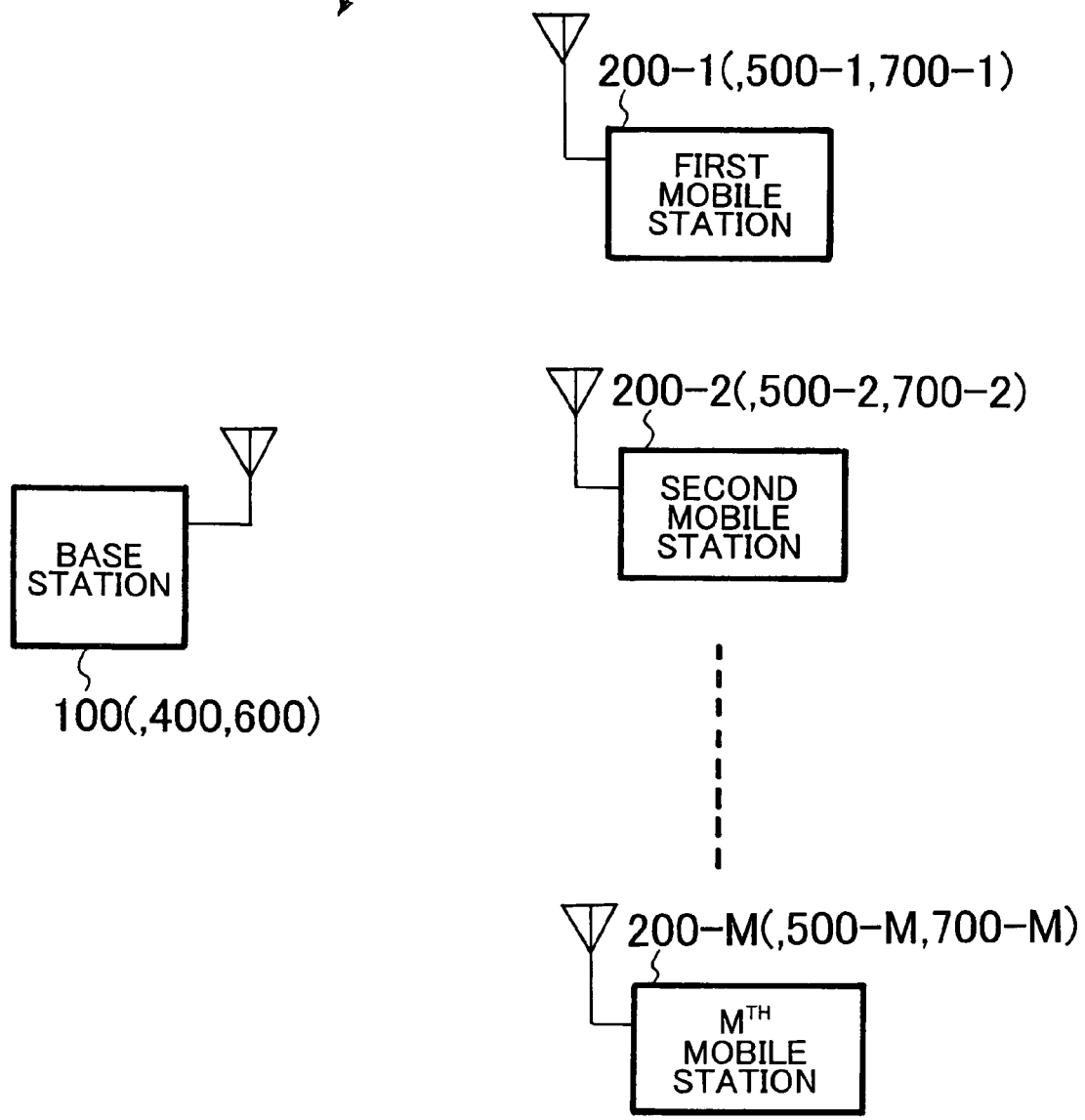
FIG. 3 is a block diagram of a configuration of a wireless transmission system according to first to third embodiments.

FIG. 1 is a block diagram of a configuration of a base station according to the first embodiment of the present invention. FIG. 2 is a block diagram of a configuration of a mobile station according to the first embodiment. FIG. 3 is a block diagram of a configuration of a wireless transmission system in which one base station communicates with a first to an $M^{th}$ (where M is an integer equal to or greater than 2) mobile stations per base station.

Referring to FIG. 1, a base station 100 includes a receiving antenna 101, a demodulator 102, an uplink pilot signal separating unit 103, an uplink received signal quality calculating unit 104, a position information extracting unit 105, a propagation information generating unit 106, a mobile station identification number extracting unit 107, an uplink pilot control signal generating unit 108, a signal multiplexer 109, a modulator 110, and a transmitting antenna 111.

In the base station 100, the demodulator 102 demodulates received signals $S_{BA}$ transmitted from the first to the $M^{th}$ mobile stations, respectively and received by the receiving antenna 101, and outputs base station demodulated signals $S_{BDEM}$. The uplink pilot signal separating unit 103 inputs the base station demodulated signals $S_{BDEM}$, separates the base station demodulated signal $S_{BDEM}$ to first to $M^{th}$ received uplink pilot signals $S_{BP-1}$ to $S_{BP-M}$ from the first to $M^{th}$ mobile stations, respectively, and outputs the first to $M^{th}$ received uplink pilot signals $S_{BP-1}$ to $S_{BP-M}$. The received uplink signal quality calculating unit 104 calculates at least either received signal powers or ratios of the received signal powers to interference powers of the base station 100 for the first to the $M^{th}$ mobile stations, respectively based on the first to $M^{th}$ received uplink pilot signals $S_{BP-1}$ to $S_{BP-M}$. In addition, the received uplink signal quality calculating unit 104 outputs calculation results as first to $M^{th}$ received uplink signal quality information $S_{BR-1}$ to $S_{BR-M}$. The position information extracting unit 105 inputs the base station demodulated signals $S_{BDEM}$, and extracts first to $M^{th}$ received signal position information $S_{BL-1}$ to $S_{BL-M}$.

The propagation information generating unit 106 inputs the first to $M^{th}$ received uplink signal quality information $S_{BR-1}$ to $S_{BR-M}$ and the first to $M^{th}$ received signal position information $S_{BL-1}$ to $S_{BL-M}$. In addition, the propagation information generating unit 106 generates quality-position correspondence information having the first to $M^{th}$ received uplink signal quality information $S_{BR-1}$ to $S_{BR-M}$ correspond to the first to $M^{th}$ received signal position information $S_{BL-1}$ to $S_{BL-M}$, respectively. Further, the propagation information generating unit 106 outputs the quality-position correspondence information as propagation information $S_{BQ}$.

The mobile station identification number extracting unit 107 inputs the base station demodulated signals $S_{BDEM}$, and extracts first to $M^{th}$ received signal mobile station identification numbers $S_{BID-1}$ to $S_{BID-M}$. The uplink pilot control signal generating unit 108 determines pattern numbers of pilot signals used by the first to the $M^{th}$ mobile stations in an order of starting communication with the base station 100 based on the first to $M^{th}$ received signal mobile station identification numbers $S_{BID-1}$ to $S_{BID-M}$. In addition, the uplink pilot control signal generating unit 108 generates an uplink pilot control signal $S_{BPC}$ having the pattern numbers of the pilot signals used by the first to $M^{th}$ mobile stations correspond to the first to $M^{th}$ mobile station identification numbers $S_{BID-1}$ to $S_{BID-M}$, respectively. The signal multiplexer 109 multiplexes the propagation information $S_{BQ}$ with the uplink pilot control signal $S_{BPC}$, and outputs a downlink multiplexed signal $S_{BM}$. The modulator 110 modulates the downlink multiplexed signal $S_{BM}$, and outputs a transmitted downlink signal $S_{BTX}$. The transmitted downlink signal $S_{BTX}$ is transmitted from the transmitting antenna 111 to the first to the $M^{th}$ mobile stations.

Referring to FIG. 2, a mobile station 200 includes a receiving antenna 201, a demodulator 202, a propagation information extracting unit 203, a display information calculating unit 204, a propagation information display unit 205, an uplink pilot control signal extracting unit 206, a mobile station identification number generating unit 207, a position information generating unit 208, an uplink pilot signal generating unit 209, a signal multiplexer 210, a modulator 211, and a transmitting antenna 212.

In the mobile station 200, the demodulator 202 demodulates a received signal $S_{MA}$ received by the receiving antenna 201 and transmitted from the base station 100, and outputs a mobile station demodulated signal $S_{MDEM}$. The propagation information extracting unit 203 inputs the mobile station demodulated signal $S_{MDEM}$, and extracts propagation information $S_{MF}$. The display information calculating unit 204 inputs the propagation information $S_{MF}$. In addition, the display information calculating unit 204 outputs map information having first to $M^{th}$ received uplink signal quality information $S_{BR-1}$ to $S_{BR-M}$ plotted at positions indicated by first to $M^{th}$ position information $S_{BL-1}$ to $S_{BL-M}$, respectively, as terminal-display information $S_{MCA}$. Further, the display information calculating unit 204 may alternatively or additionally input the propagation information $S_{MF}$. In addition, the display information calculating unit 204 may calculate a direction and a distance of a most proximate location to the mobile station 200 from among the locations in which a predetermined item (e.g., at least one item or all items) among respective items i of the received uplink signal quality information on the map indicated by the propagation information $S_{MF}$ attains a value equal to or greater than Yi (where Yi is a real number greater than zero) determined by a user that owns the mobile station 200, and output the calculated direction and distance as the terminal display information $S_{MCA}$. The propagation information display unit 205 inputs and displays the terminal display information $S_{MCA}$ on a terminal screen.

The uplink pilot control signal extracting unit 206 inputs the mobile station demodulated signal $S_{MDEM}$, and extracts a received uplink pilot control signal $S_{MPC}$.

The mobile station identification number generating unit 207 generates a predetermined mobile station identification number $S_{MID}$ of the mobile station 200. The position information generating unit 208 outputs a position of the mobile station 200 measured using a global positioning system (GPS) as position information $S_{ML}$. The uplink pilot signal generating unit 209 inputs the received uplink pilot control signal $S_{MPC}$ and the mobile station identification number $S_{MID}$. In addition, the uplink pilot signal generating unit 209 generates an uplink pilot signal $S_{MTP}$ using a pilot signal pattern of a pattern number corresponding to the same mobile station identification number as the mobile station identification number $S_{MID}$ in the received uplink pilot control signal $S_{MPC}$. The signal multiplexer 210 multiplexes the uplink pilot signal $S_{MTP}$, the mobile station identification number $S_{MID}$, and the position information $S_{ML}$, and outputs an uplink multiplexed signal $S_{MM}$. The modulator 211 modulates the uplink multiplexed signal $S_{MM}$, and outputs a transmitted uplink signal $S_{MTX}$. The transmitted uplink signal $S_{MTX}$ is transmitted to the base station 100 from the transmitting antenna 212.

Referring to FIG. 3, a wireless transmission system 300 includes the base station 100 and first to $M^{th}$ mobile stations 200-1 to 200-M.

In this embodiment, the above-stated operation makes it possible for the base station 100 to provide each mobile station with the propagation information having the positions of the mobile stations 200-1 to 200-M correspond to the received uplink signal powers at the respective positions in advance. Each mobile station can, therefore, arrive at the location for efficiently providing a good received signal quality.

Second Embodiment

Figure 4:
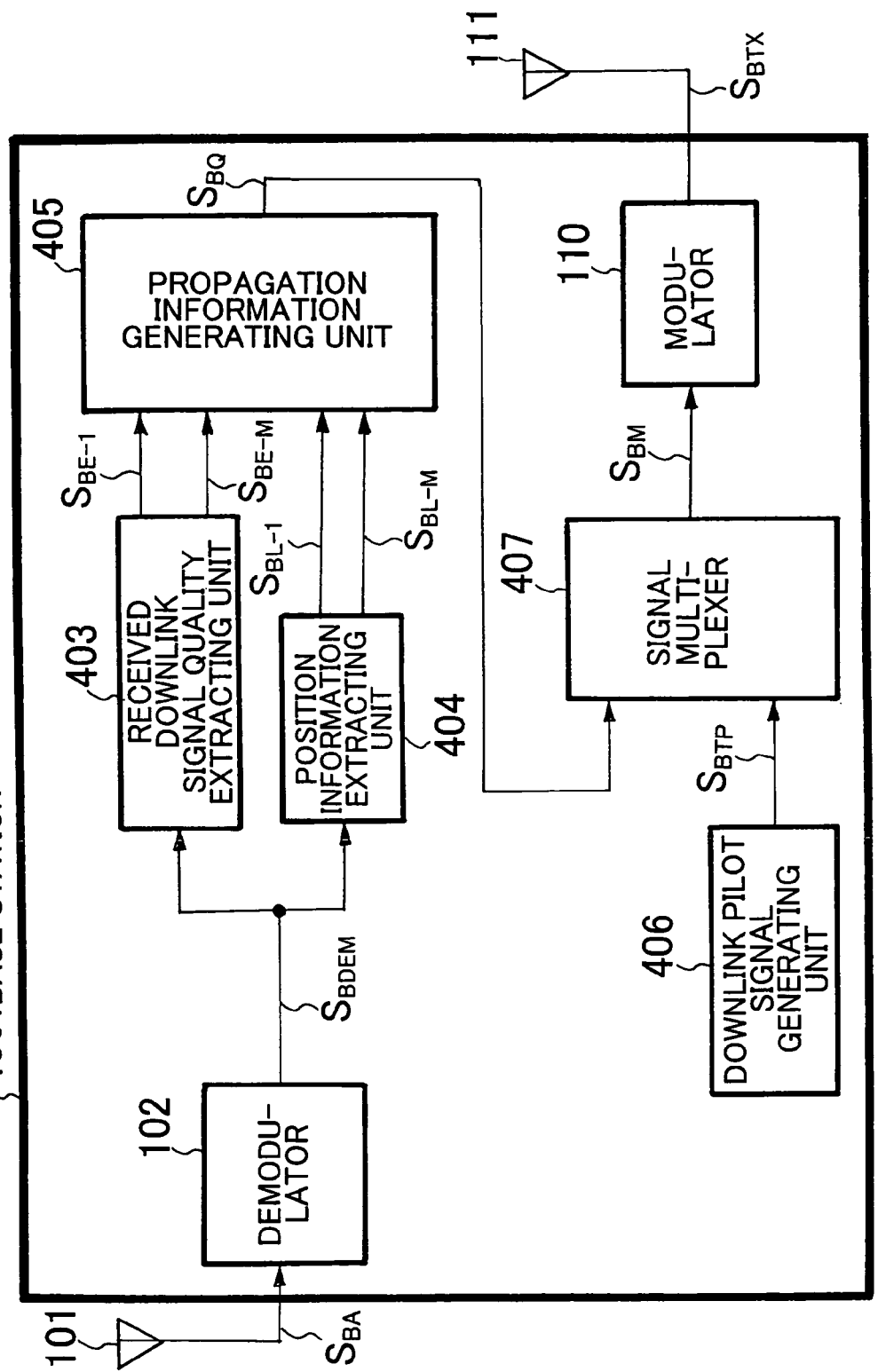
FIG. 4 is a block diagram of a configuration of a base station according to a second embodiment of the present invention.
Figure 5:
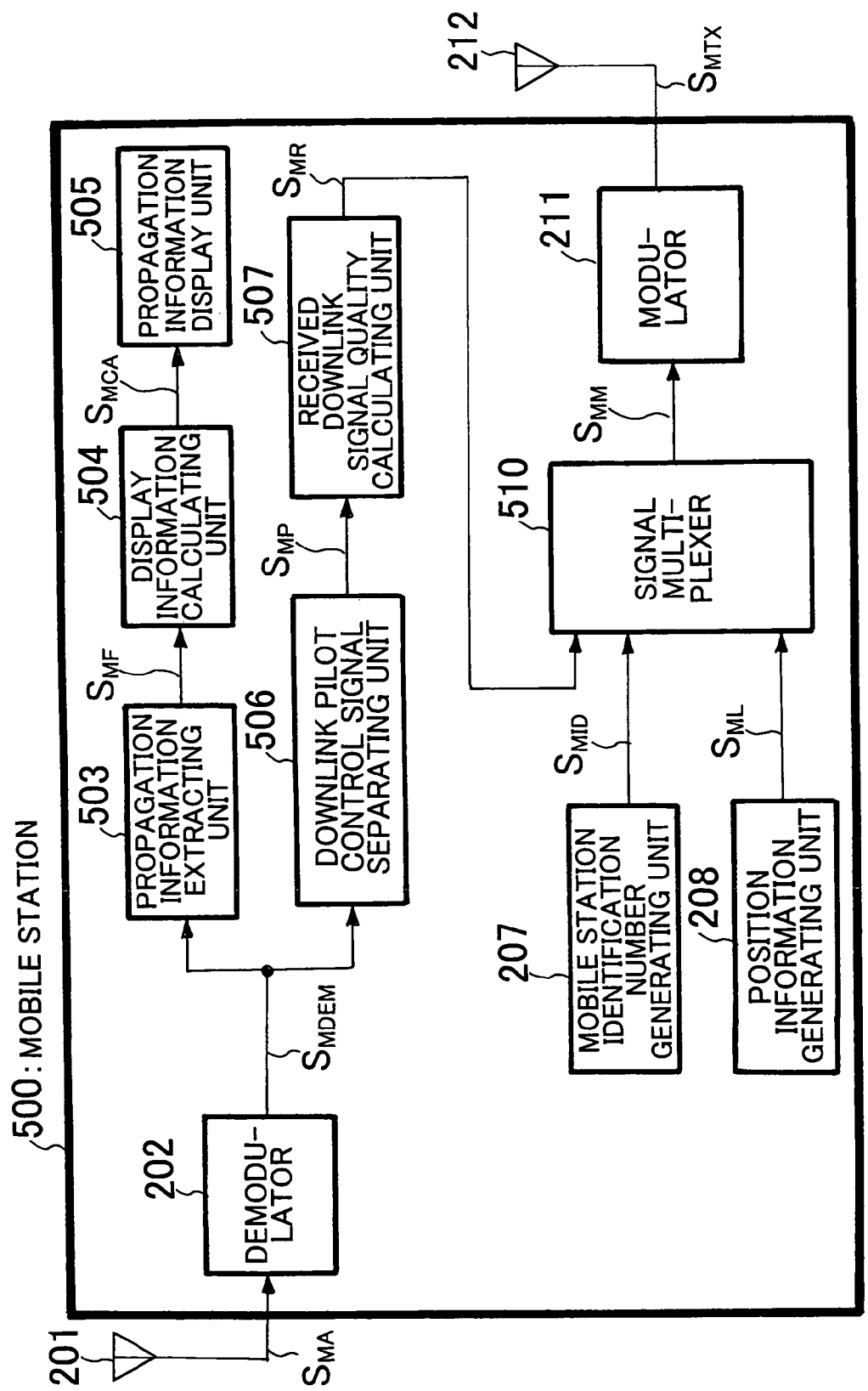
FIG. 5 is a block diagram of a configuration of a mobile station according to the second embodiment.

FIG. 4 is a block diagram of a configuration of a base station according to the second embodiment of the present invention. FIG. 5 is a block diagram of a configuration of a mobile station according to the second embodiment. A block diagram of a wireless transmission system according to the second embodiment is the same as that according to the first embodiment shown in FIG. 3.

Referring to FIG. 4, a base station 400 includes a receiving antenna 101, a demodulator 102, a received downlink signal quality information extraction unit 403, a position information extracting unit 404, a propagation information generating unit 405, a downlink pilot signal generating unit 406, a signal multiplexer 407, a modulator 110, and a transmitting antenna 111.

In the base station 400, the demodulator 102 demodulates a received signal $S_{BA}$ received by the receiving antenna 101 and transmitted from each of a first to $M^{th}$ mobile stations, and outputs a base station demodulated signal $S_{BDEM}$. The received downlink signal quality information extracting unit 403 inputs the base station demodulated signal $S_{BDEM}$, and extracts first to $M^{th}$ received downlink signal quality information $S_{BE-1}$ to $S_{BE-M}$. The position information extracting unit 404 inputs the base station demodulated signals $S_{BDEM}$, and extracts first to $M^{th}$ received signal position information $S_{BL-1}$ to $S_{BL-M}$.

The propagation information generating unit 405 inputs the first to $M^{th}$ received downlink signal quality information $S_{BE-1}$ to $S_{BE-M}$ and the first to $M^{th}$ received signal position information $S_{BL-1}$ to $S_{BL-M}$. In addition, the propagation information generating unit 405 generates quality-position correspondence information having the first to $M^{th}$ received downlink signal quality information $S_{BR-1}$ to $S_{BR-M}$ correspond to the first to $M^{th}$ received signal position information $S_{BL-1}$ to $S_{BL-M}$, respectively, and outputs the generated quality-position correspondence information as propagation information $S_{BQ}$.

The downlink pilot signal generating unit 406 generates a downlink pilot signal $S_{BTP}$. The signal multiplexer 407 multiplexes the propagation information $S_{BQ}$ with the downlink pilot signal $S_{BTP}$, and outputs a downlink multiplexed signal $S_{BM}$. The modulator 110 modulates the downlink multiplexed signal $S_{BM}$, and outputs a transmitted downlink signal $S_{BTX}$. The transmitted downlink signal $S_{BTX}$ is transmitted from the transmitting antenna 111 to the first to $M^{th}$ mobile stations.

Referring to FIG. 5, a mobile station 500 includes a receiving antenna 201, a demodulator 202, a propagation information extracting unit 503, a display information calculating unit 504, a propagation information display unit 505, a downlink pilot signal separating unit 506, a received downlink signal quality calculating unit 507, a mobile station identification number generating unit 207, a position information generating unit 208, a signal multiplexer 510, a modulator 211, and a transmitting antenna 212.

In the mobile station 500, the demodulator 202 demodulates a received signal $S_{MA}$ received by the receiving antenna 201 and transmitted from the base station 400, and outputs a mobile station demodulated signal $S_{MDEM}$. The propagation information extracting unit 503 inputs the mobile station demodulated signal $S_{MDEM}$, and extracts propagation information $S_{MF}$. The display information calculating unit 504 inputs the propagation information $S_{MF}$. In addition, the display information calculating unit 504 outputs map information having first to $M^{th}$ received downlink signal quality information $S_{BE-1}$ to $S_{BE-M}$ plotted at positions indicated by first to $M^{th}$ position information $S_{BL-1}$ to $S_{BL-M}$, respectively, as terminal display information $S_{MCA}$. Further, the display information calculating unit 504 may alternatively or additionally input the propagation information $S_{MF}$. In addition, the display information calculating unit 504 may calculate a direction and a distance of a most proximate location to the mobile station 500 from among the locations in which a predetermined item (e.g., at least one item or all items) among respective items i of the received downlink signal quality information on the map indicated by the propagation information $S_{MF}$ attains a value equal to or greater than Yi (where Yi is a real number greater than zero) determined by a user that owns the mobile station 500, and output the calculated direction and distance as the terminal display information $S_{MCA}$. The propagation information display unit 505 inputs and displays the terminal display information $S_{MCA}$ on a terminal screen.

The downlink pilot signal separating unit 506 inputs the mobile station demodulated signal $S_{MDEM}$, and separates and outputs a received downlink pilot signal $S_{MP}$ from the base station 400. The received downlink signal quality calculating unit 507 inputs the received downlink signal $S_{MP}$, calculates at least either a received signal power in the mobile station 500 or a ratio of the received signal power to an interference power in the mobile station 500, and outputs a calculation result as received downlink signal quality information $S_{MR}$.

The mobile station identification number generating unit 207 generates a predetermined mobile station identification number $S_{MID}$ of the mobile station 500. The position information generating unit 208 outputs a position of the mobile station 500 measured using the GPS as position information $S_{ML}$. The signal multiplexer 510 multiplexes the received downlink signal quality information $S_{MR}$, the mobile station identification number $S_{MID}$, and the position information $S_{ML}$, and outputs an uplink multiplexed signal $S_{MM}$. The modulator 211 modulates the uplink multiplexed signal $S_{MM}$, and outputs a transmitted uplink signal $S_{MTX}$. The transmitted uplink signal $S_{MTX}$ is transmitted to the base station 400 from the transmitting antenna 212.

Referring to FIG. 3, the wireless transmission system 300 includes the base station 400 and first to $M^{th}$ mobile stations 500-1 to 500-M.

In this embodiment, the above-stated operation makes it possible for the base station 400 to provide each mobile station with the propagation information having the positions of the mobile stations 500-1 to 500-M correspond to the received downlink signal powers at the respective positions in advance. Each mobile station can, therefore, arrive at the location for efficiently providing a good received signal quality.

Third Embodiment

Figure 6:
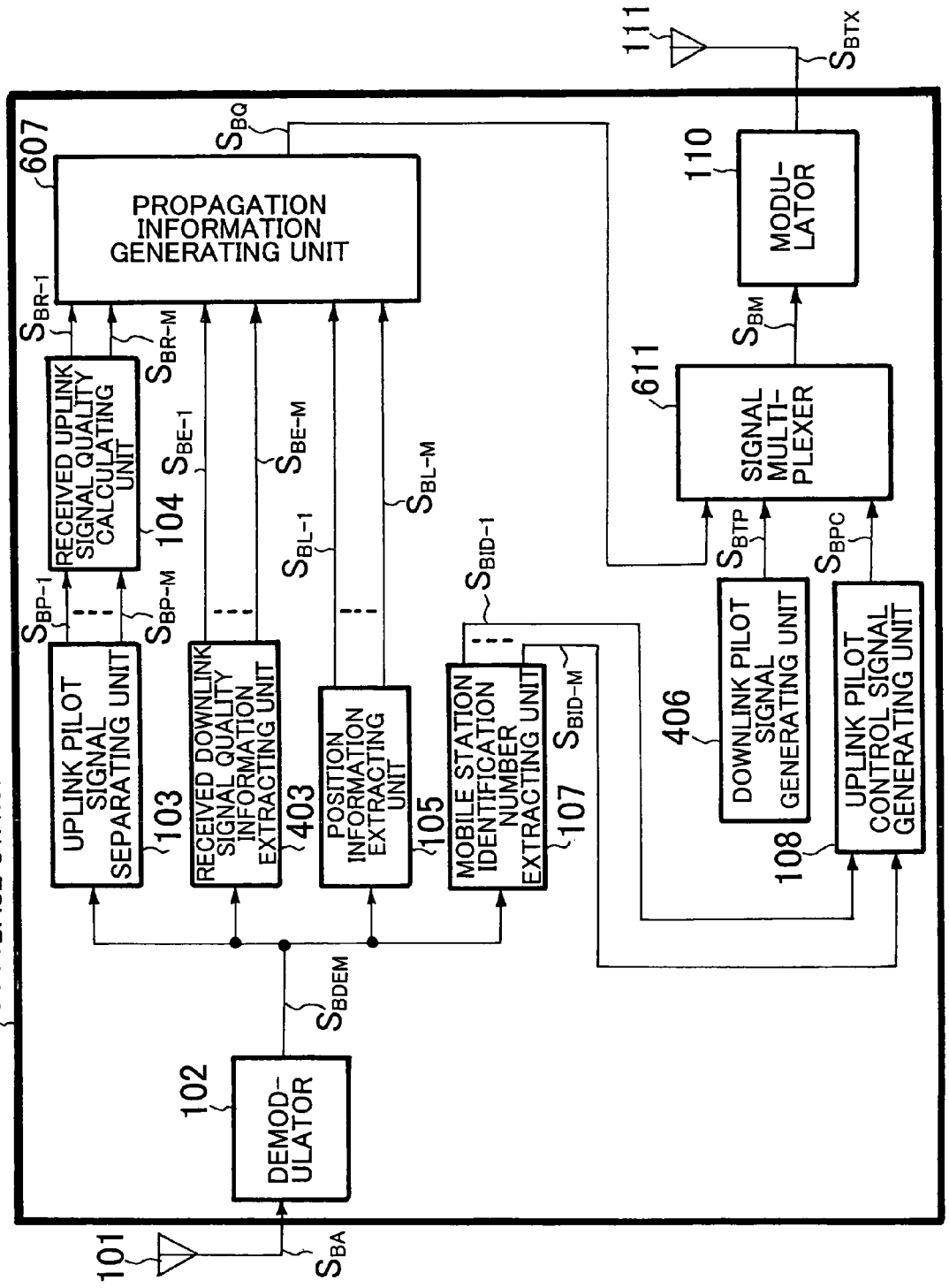
FIG. 6 is a block diagram of a configuration of a base station according to a third embodiment of the present invention.
Figure 7:
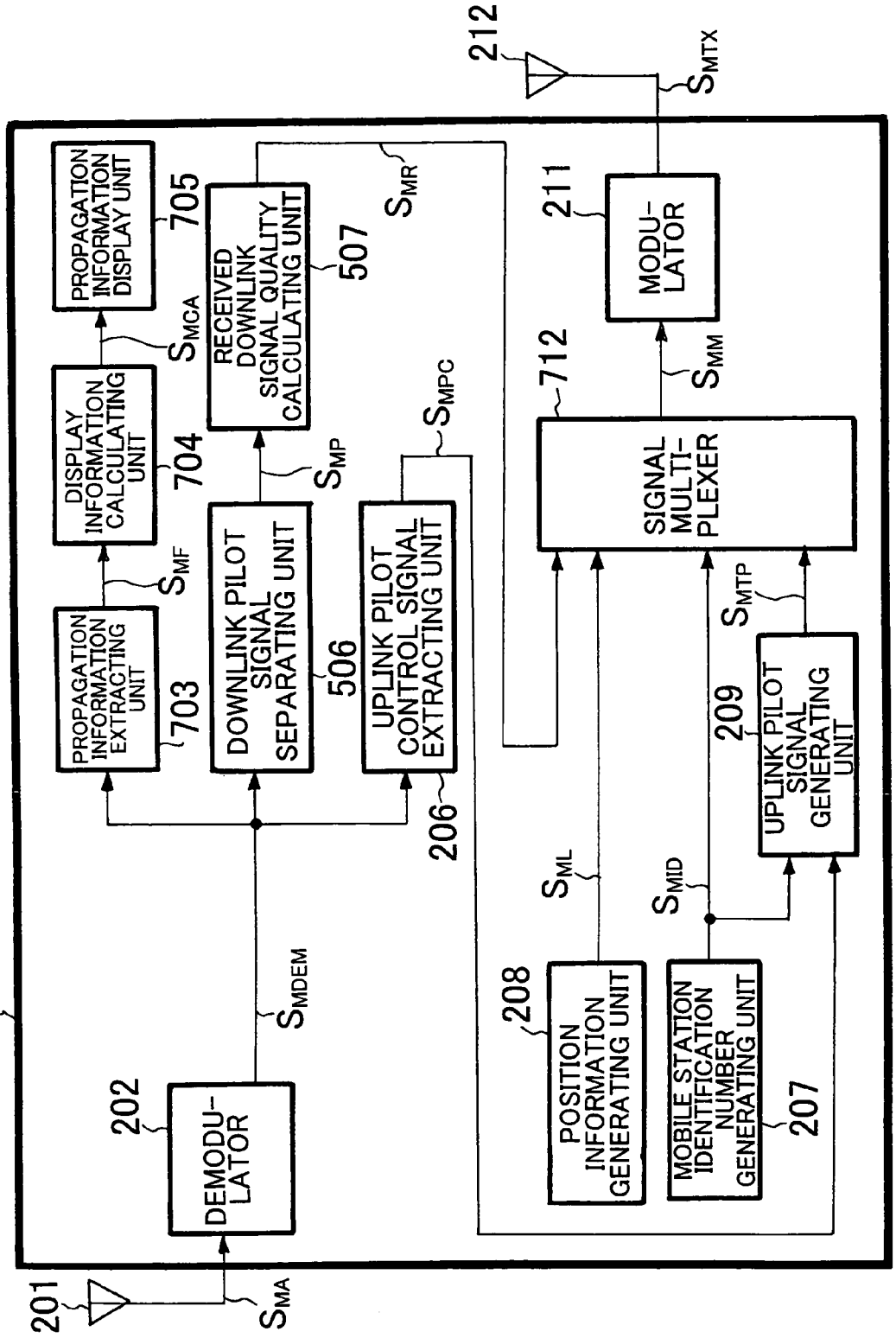
FIG. 7 is a block diagram of a configuration of a mobile station according to the third embodiment.

FIG. 6 is a block diagram of a configuration of a base station according to the third embodiment of the present invention. FIG. 7 is a block diagram of a configuration of a mobile station according to the third embodiment. A block diagram of a wireless transmission system according to the third embodiment is the same as that according to the first embodiment shown in FIG. 3.

Referring to FIG. 6, a base station 600 includes a receiving antenna 101, a demodulator 102, an uplink pilot signal separating unit 103, a received uplink signal quality calculating unit 104, a received downlink signal quality information extracting unit 403, a position information extracting unit 105, a propagation information generating unit 607, a mobile station identification number extracting unit 107, a downlink pilot signal generating unit 406, an uplink pilot control signal generating unit 108, a signal multiplexer 611, a modulator 110, and a transmitting antenna 111.

In the base station 600, the demodulator 102 demodulates received signals $S_{BA}$ transmitted from the first to the $M^{th}$ mobile stations, respectively and received by the receiving antenna 101, and outputs base station demodulated signals $S_{BDEM}$. The uplink pilot signal separating unit 103 inputs the base station demodulated signals $S_{BDEM}$, separates the base station demodulated signal $S_{BDEM}$ to first to $M^{th}$ received uplink pilot signals $S_{BP-1}$ to $S_{BP-M}$ from the first to $M^{th}$ mobile stations, respectively, and outputs the first to $M^{th}$ received uplink pilot signals $S_{BP-1}$ to $S_{BP-M}$. The received uplink signal quality calculating unit 104 calculates at least either received signal powers or ratios of the received signal powers to interference powers of the base station 600 for the first to the $M^{th}$ mobile stations, respectively based on the first to $M^{th}$ received uplink pilot signals $S_{BP-1}$ to $S_{BP-M}$. In addition, the received uplink signal quality calculating unit 104 outputs calculation results as first to $M^{th}$ received uplink signal quality information $S_{BR-1}$ to $S_{BR-M}$. The received downlink signal quality information extracting unit 403 inputs the base station demodulated signal $S_{BDEM}$, and extracts first to $M^{th}$ received downlink signal quality information $S_{BE-1}$ to $S_{BE-M}$. The position information extracting unit 105 inputs the base station demodulated signals $S_{BDEM}$, and extracts first to $M^{th}$ received signal position information $S_{BL-1}$ to $S_{BL-M}$.

The propagation information generating unit 607 inputs the first to $M^{th}$ received signal position information $S_{BL-1}$ to $S_{BL-M}$, the first to $M^{th}$ received uplink signal quality information $S_{BR-1}$ to $S_{BR-M}$, and the first to $M^{th}$ received downlink signal quality information $S_{BE-1}$ to $S_{BE-M}$. In addition, the propagation information generating unit 607 generates quality-position correspondence information having the first to $M^{th}$ received signal position information $S_{BL-1}$ to $S_{BL-M}$, the first to $M^{th}$ received uplink signal quality information $S_{BR-1}$ to $S_{BR-M}$, and the first to $M^{th}$ received downlink signal quality information $S_{BE-1}$ to $S_{BE-M}$ correspond to one another, respectively. Further, the propagation information generating unit 607 outputs the quality-position correspondence information as propagation information $S_{BQ}$.

The mobile station identification number extracting unit 107 inputs the base station demodulated signals $S_{BDEM}$, and extracts first to $M^{th}$ received signal mobile station identification numbers $S_{BID-1}$ to $S_{BID-M}$. The downlink pilot signal generating unit 406 generates a downlink pilot signal $S_{BTP}$. The uplink pilot control signal generating unit 108 determines pattern numbers of pilot signals used by the first to the $M^{th}$ mobile stations in an order of starting communication with the base station 600 based on the first to $M^{th}$ received signal mobile station identification numbers $S_{BID-1}$ to $S_{BID-M}$. In addition, the uplink pilot control signal generating unit 108 generates an uplink pilot control signal $S_{BPC}$ having the pattern numbers of the pilot signals used by the first to $M^{th}$ mobile stations correspond to the first to $M^{th}$ mobile station identification numbers $S_{BID-1}$ to $S_{BID-M}$, respectively. The signal multiplexer 611 multiplexes the propagation information $S_{BQ}$, the downlink pilot signal $S_{BTP}$, and the uplink pilot control signal $S_{BPC}$, and outputs a downlink multiplexed signal $S_{BM}$. The modulator 110 modulates the downlink multiplexed signal $S_{BM}$, and outputs a transmitted downlink signal $S_{BTX}$. The transmitted downlink signal $S_{BTX}$ is transmitted from the transmitting antenna 111 to the first to the $M^{th}$ mobile stations.

Referring to FIG. 7, a mobile station 700 includes a receiving antenna 201, a demodulator 202, a propagation information extracting unit 703, a display information calculating unit 704, a propagation information display unit 705, a downlink pilot signal separating unit 506, a received downlink signal quality calculating unit 507, an uplink pilot control signal extracting unit 206, a position information generating unit 208, a mobile station identification number generating unit 207, an uplink pilot signal generating unit 209, a signal multiplexer 712, a modulator 211, and a transmitting antenna 212.

In the mobile station 700, the demodulator 202 demodulates a received signal $S_{MA}$ received by the receiving antenna 201 and transmitted from the base station 600, and outputs a mobile station demodulated signal $S_{MDEM}$. The propagation information extracting unit 703 inputs the mobile station demodulated signal $S_{MDEM}$, and extracts propagation information $S_{MF}$. The display information calculating unit 704 inputs the propagation information $S_{MF}$. In addition, the display information calculating unit 704 outputs map information having first to $M^{th}$ received uplink signal quality information $S_{BR-1}$ to $S_{BR-M}$ and first to $M^{th}$ received downlink signal quality information $S_{BE-1}$ to $S_{BE-M}$ plotted at positions indicated by first to $M^{th}$ position information $S_{BL-1}$ to $S_{BL-M}$, respectively, as terminal display information $S_{MCA}$. Further, the display information calculating unit 704 may alternatively or additionally input the propagation information $S_{MF}$. In addition, the display information calculating unit 704 may calculate a direction and a distance of a most proximate location to the mobile station 600 from among the locations in which a predetermined item (e.g., at least one item or all items) among respective items i of the received downlink signal quality information on the map indicated by the propagation information $S_{MF}$ attains a value equal to or greater than Yi (where Yi is a real number greater than zero) determined by a user that owns the mobile station 700, and in which a predetermined item (e.g., at least one item or all items) among respective items j of the received uplink signal quality information on the map attains a value equal to or greater than Zi (where Zi is a real number greater than zero) determined by the user that owns the mobile station 700, and output the calculated direction and distance as the terminal display information $S_{MCA}$. The propagation information display unit 705 inputs and displays the terminal display information $S_{MCA}$ on a terminal screen.

The downlink pilot signal separating unit 506 inputs the mobile station demodulated signal $S_{MDEM}$, and separates and outputs a received downlink pilot signal $S_{MP}$ from the base station 600. The received downlink signal quality calculating unit 507 inputs the received downlink signal $S_{MP}$, calculates at least either a received signal power in the mobile station 700 or a ratio of the received signal power to an interference power in the mobile station 700, and outputs a calculation result as received downlink signal quality information $S_{MR}$. The uplink pilot control signal extracting unit 206 inputs the mobile station demodulated signal $S_{MDEM}$, and extracts a received uplink pilot control signal $S_{MPC}$.

The position information generating unit 208 outputs a position of the mobile station 700 measured using the GPS as position information $S_{ML}$. The mobile station identification number generating unit 207 generates a predetermined mobile station identification number $S_{MID}$ of the mobile station 700. The uplink pilot signal generating unit 209 inputs the received uplink pilot control signal $S_{MPC}$ and the mobile station identification number $S_{MID}$. In addition, the uplink pilot signal generating unit 209 generates an uplink pilot signal $S_{MTP}$ using a pilot signal pattern of a pattern number corresponding to the same mobile station identification number as the mobile station identification number $S_{MID}$ in the received uplink pilot control signal $S_{MPC}$. The signal multiplexer 712 multiplexes the uplink pilot signal $S_{MTP}$, the mobile station identification number $S_{MID}$, and the position information $S_{ML}$, and outputs an uplink multiplexed signal $S_{MM}$. The modulator 211 modulates the uplink multiplexed signal $S_{MM}$, and outputs a transmitted uplink signal $S_{MTX}$. The transmitted uplink signal $S_{MTX}$ is transmitted to the base station 600 from the transmitting antenna 212.

Referring to FIG. 3, the wireless transmission system 300 includes the base station 600 and first to $M^{th}$ mobile stations 700-1 to 700-M.

In this embodiment, the above-stated operation makes it possible for the base station 600 to provide each mobile station with the propagation information having the positions of the mobile stations 700-1 to 700-M correspond to the received uplink signal powers and the received downlink signal powers at the respective positions in advance. Each mobile station can, therefore, arrive at the location for efficiently providing a good received signal quality.

Fourth Embodiment

If a plurality of mobile stations transmit signals with the same frequency at the same time using a multiple-input/multiple-output (MIMO) technique, a transmission rate is greatly changed according to a propagation path correlation among the mobile stations in a base station. If the propagation path correlation among the mobile stations is low, the base station can separate the signals from the plural mobile stations. However, if the propagation path correlation among the mobile stations is high, it is difficult for the base station to separate the signals from the plural mobile stations. The propagation path correlation among the mobile stations is information that can be calculated based on propagation path information on all the mobile stations. If this propagation path correlation information is not provided to each mobile station, the mobile station cannot confirm whether the propagation path correlation causes a reduction in transmission rate. Due to this, even if a relative positional relation among the mobile stations is changed by movement of the mobile stations and the propagation path correlation among the mobile stations is reduced, each mobile station cannot be moved to an optimum location at an optimum timing. As a result, the mobile station inevitably continues a communication with the base station at the low transmission rate.

Figure 8:
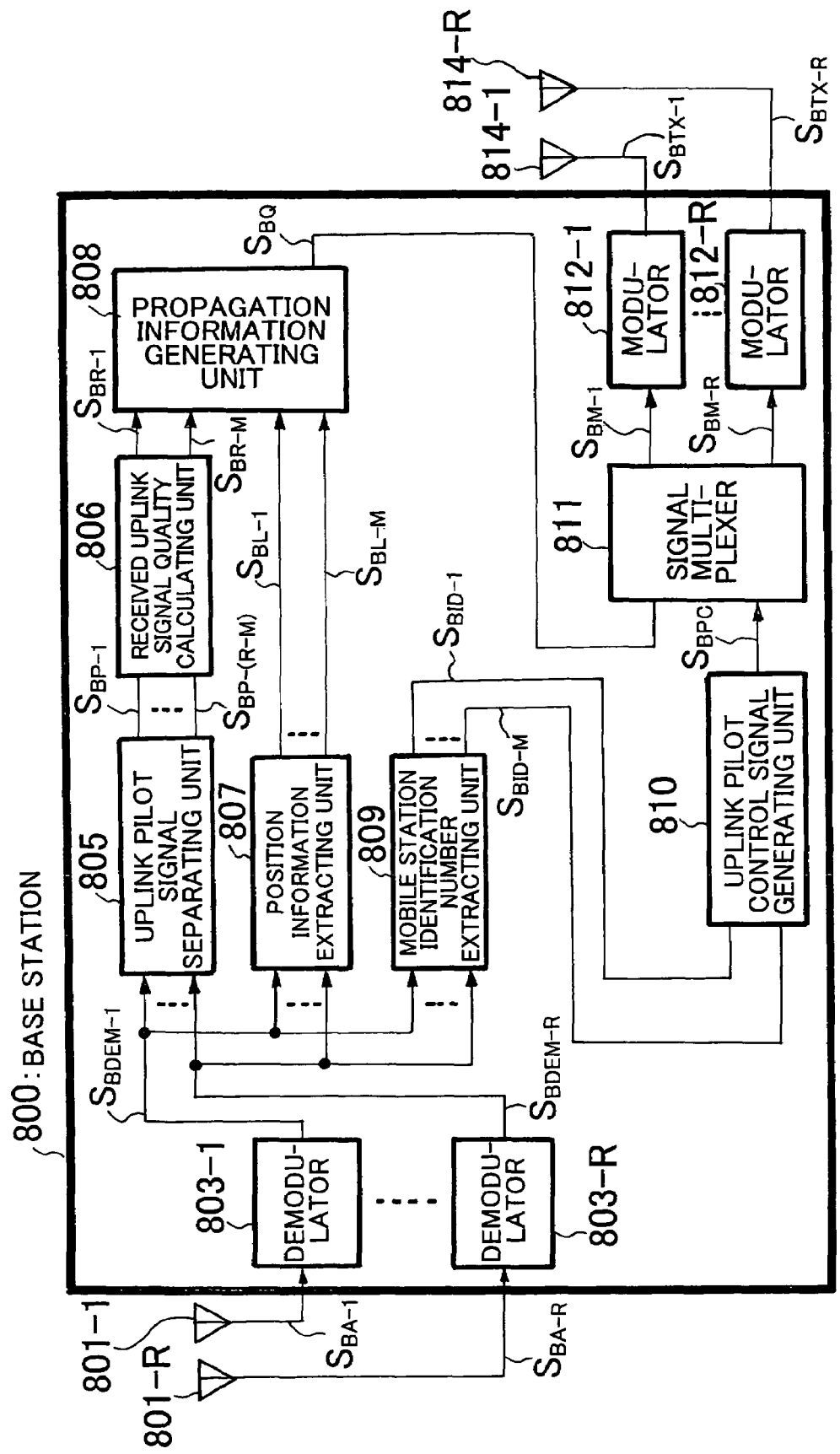
FIG. 8 is a block diagram of a configuration of a base station according to a fourth embodiment of the present invention.
Figure 9:
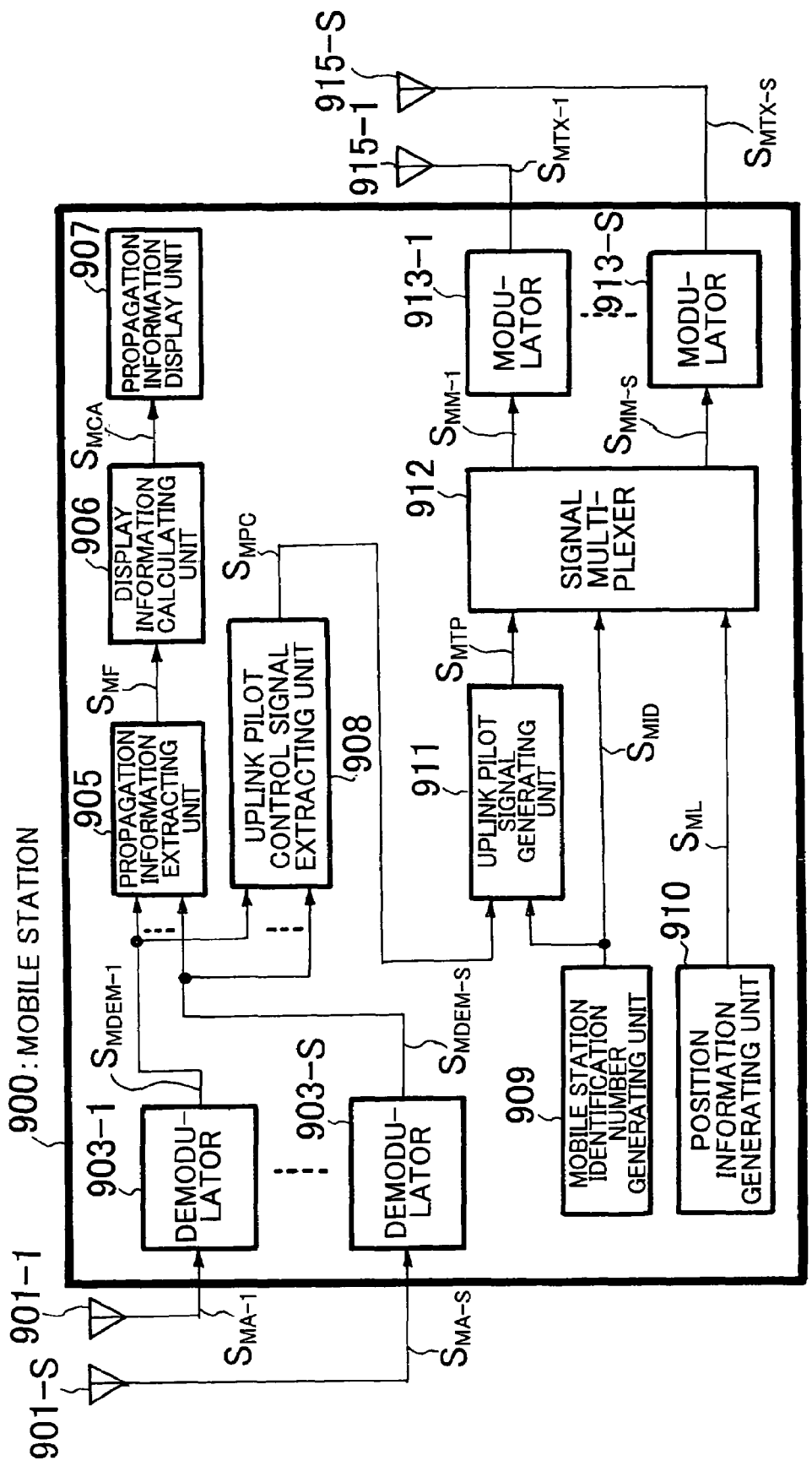
FIG. 9 is a block diagram of a configuration of a mobile station according to the fourth embodiment.
Figure 10:
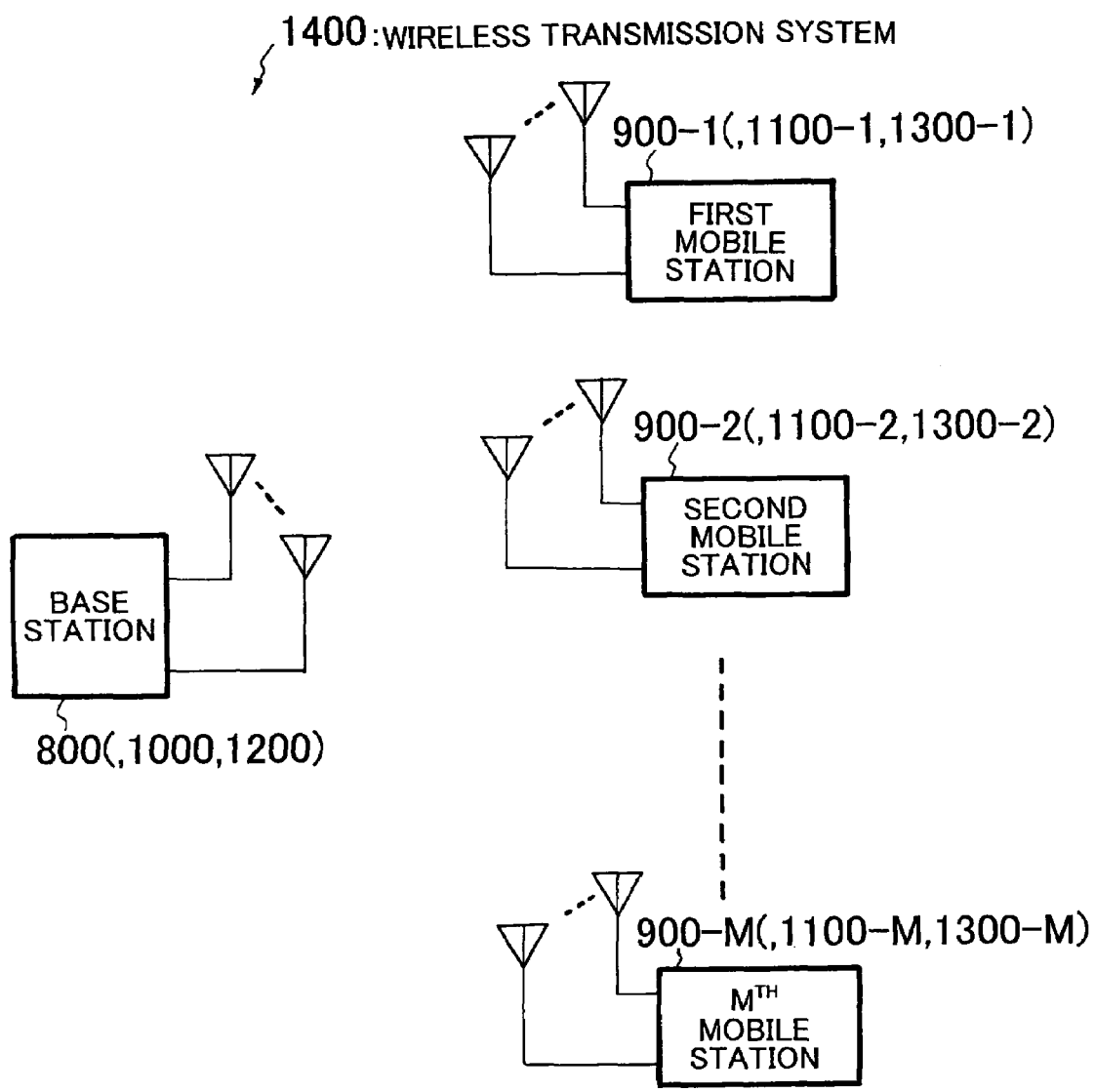
FIG. 10 is a block diagram of a configuration of a wireless transmission system according to the fourth embodiment.

The fourth embodiment of the present invention is based on a MIMO transmission method and intended to solve the above-stated disadvantages. FIG. 8 is a block diagram of a configuration of a base station 800 according to the fourth embodiment of the present invention. FIG. 9 is a block diagram of a configuration of a mobile station according to the fourth embodiment. FIG. 10 is a block diagram of a configuration of a wireless transmission system in which one base station including a plurality of transmitting and receiving antennas communicates with a first to an $M^{th}$ mobile stations each including a plurality of transmitting and receiving antennas per base station.

Referring to FIG. 8, a base station 800 includes first to $R^{th}$ (where R is a natural number) receiving antennas 801-1 to 801-R, first to $R^{th}$ demodulators 803-1 to 803-R, an uplink pilot signal separating unit 805, a received uplink signal quality calculating unit 806, a position information extracting unit 807, a propagation information generating unit 808, a mobile station identification number extracting unit 809, an uplink pilot control signal generating unit 810, a signal multiplexer 811, first to $R^{th}$ modulators 812-1 to 812-R, and first to $R^{th}$ transmitting antennas 814-1 to 814-R.

In the base station 800, the first to $R^{th}$ demodulators 803-1 to 803-R demodulate first to $R^{th}$ received signals $S_{BA-1}$ to $S_{BA-R}$ received by the first to $R^{th}$ receiving antennas 801-1 to 801-R, and outputs first to $R^{th}$ base station demodulated signals $S_{BDEM-1}$ to $S_{BDEM-R}$. The uplink pilot signal separating unit 805 inputs the first to $R^{th}$ base station demodulated signals $S_{BDEM-1}$ to $S_{BDEM-R}$, and separates uplink pilot signals from the first to $M^{th}$ mobile stations for each of the first to $R^{th}$ base station demodulated signals $S_{BDEM-1}$ to $S_{BDEM-R}$. In addition, the uplink pilot signal separating unit 805 outputs received uplink pilot signals $S_{BP-1}$ to $S_{BP-(R*M)}$ of first to $(R*M)^{th}$, i.e., (R*M) sequences in all.

The received uplink signal quality calculating unit 806 inputs the first to $(R*M)^{th}$ received uplink pilot signals $S_{BP-1}$ to $S_{BP-(R*M)}$. In addition, the received uplink signal quality calculating unit 806 outputs first to $M^{th}$, i.e., M in all, received uplink signal quality information $S_{BR-1}$ to $S_{BR-M}$, while setting a maximum of propagation path correlations between an $i^{th}$ mobile station and the other (M-1) mobile stations as $i^{th}$ received uplink signal quality information $S_{BR-i}$.

In the above description, the received uplink signal quality calculating unit 806 sets the maximum of the propagation path correlations between the $i^{th}$ mobile station and the other (M-1) mobile stations as the $i^{th}$ received uplink signal quality information $S_{BR-i}$. Alternatively, an average of the propagation path correlations between the $i^{th}$ mobile station and the other (M-1) mobile stations may be set as the $i^{th}$ received uplink signal quality information $S_{BR-i}$.

Further, the received uplink signal quality information $S_{BR-1}$ to $S_{BR-M}$ output from the received uplink signal quality calculating unit 806 are set as the propagation path correlations among the mobile stations. Alternatively, if the number S of the transmitting antennas of each base station is an integer equal to or greater than 2, the received uplink signal quality information $S_{BR-1}$ to $S_{BR-M}$ may be set as correlations among the transmitting antennas in the respective mobile stations. In this case, the correlation among the transmitting antennas in the respective mobile stations refer to correlations among received signals which the base station 800 calculates by receiving the signals from all the antennas of the respective mobile stations. This calculation is made by the received uplink signal quality calculating unit 806 of the base station 800.

Further, the received uplink signal quality calculating unit 806 may additionally or alternatively input the first to (R*M)$^{th}$ received uplink pilot signals $S_{BP-1}$ to $S_{BR-(R*M)}$. In addition, the received uplink signal quality calculating unit 806 may calculate at least either received signal powers in the base station 800 for the respective first to $M^{th}$ mobile stations or ratios of the received signal powers to interference powers in the base station 800 for the respective first to $M^{th}$ mobile stations, and output calculation results as the first to $M^{th}$ received uplink signal quality information $S_{BR-1}$ to $S_{BR-M}$.

The position information extracting unit 807 inputs the first to $R^{th}$ base station demodulated signals $S_{BDEM-1}$ to $S_{BDEM-R}$, and extracts first to $M^{th}$ received signal position information $S_{BL-1}$ to $S_{BL-M}$.

The propagation information generating unit 808 inputs the first to $M^{th}$ received uplink signal quality information $S_{BR-1}$ to $S_{BR-M}$ and the first to $M^{th}$ received signal position information $S_{BL-1}$ to $S_{BL-M}$. In addition, the propagation information generating unit 808 generates quality-position correspondence information having the first to $M^{th}$ received signal position information $S_{BL-1}$ to $S_{BL-M}$ correspond to the first to $M^{th}$ received uplink signal quality information $S_{BR-1}$ to $S_{BR-M}$, respectively, and outputs the quality-position correspondence information as propagation information $S_{BQ}$.

The mobile station identification number extracting unit 809 inputs the first to $R^{th}$ base station demodulated signals $S_{BDEM-1}$ to $S_{BDEM-R}$, and extracts first to $M^{th}$ received signal mobile station identification numbers $S_{BID-1}$ to $S_{BID-M}$. The uplink pilot control signal generating unit 810 determines pattern numbers of pilot signals used by the first to the $M^{th}$ mobile stations in an order of starting communication with the base station 800 based on the first to $M^{th}$ received signal mobile station identification numbers $S_{BID-1}$ to $S_{BID-M}$. In addition, the uplink pilot control signal generating unit 810 generates an uplink pilot control signal $S_{BPC}$ having the pattern numbers of the pilot signals used by the first to $M^{th}$ mobile stations correspond to the first to $M^{th}$ mobile station identification numbers $S_{BID-1}$ to $S_{BID-M}$, respectively. The signal multiplexer 811 multiplexes the propagation information $S_{BQ}$ with the uplink pilot control signal $S_{BPC}$, and outputs as many first to $R^{th}$ downlink multiplexed signals $S_{BM-1}$ to $S_{BM-R}$ as the transmitting antennas 841-1 to 814-R. The first to $R^{th}$ modulators 812-1 to 812-R modulate the first to $R^{th}$ downlink multiplexed signals $S_{BM-1}$ to $S_{BM-R}$, and output the first to $R^{th}$ transmitted downlink signals $S_{BTX-1}$ to $S_{BTX-R}$, respectively. The first to $R^{th}$ transmitted downlink signals $S_{BTX-1}$ to $S_{BTX-R}$ are transmitted from first to $R^{th}$ the transmitting antenna 814-1 to 814-R to the first to the $M^{th}$ mobile stations.

Referring to FIG. 9, a mobile station 900 includes first to $S^{th}$ receiving antennas 901-1 to 901-S (where S is a natural number), first to $S^{th}$ demodulators 903-1 to 903-S, a propagation information extracting unit 905, a display information calculating unit 906, a propagation information display unit 907, an uplink pilot control signal extracting unit 908, a mobile station identification number generating unit 909, a position information generating unit 910, an uplink pilot signal generating unit 911, a signal multiplexer 912, first to $S^{th}$ modulators 913-1 to 913-S, and first to $S^{th}$ transmitting antennas 915-1 to 915-S.

In the mobile station 900, the first to $S^{th}$ demodulators 903-1 to 903-S demodulate received signals $S_{MA-1}$ to $S_{MA-S}$ received by the first to $S^{th}$ receiving antenna 901-1 to 901-S and transmitted from the base station 800, and output first to $S^{th}$ mobile station demodulated signals $S_{MDEM-1}$ to $S_{MDEM-S}$. The propagation information extracting unit 905 inputs the first to $S^{th}$ mobile station demodulated signals $S_{MDEM-1}$ to $S_{MDEM-S}$, and extracts propagation information $S_{MF}$. The display information calculating unit 906 inputs the propagation information $S_{MF}$. In addition, the display information calculating unit 906 outputs map information having first to $M^{th}$ received uplink signal quality information $S_{BR-1}$ to $S_{BR-M}$ plotted at positions indicated by first to $M^{th}$ position information $S_{BL-1}$ to $S_{BL-M}$, respectively, as terminal display information $S_{MCA}$. Further, the display information calculating unit 906 may alternatively or additionally input the propagation information $S_{MF}$. In addition, the display information calculating unit 906 may calculate a direction and a distance of a most proximate location to the mobile station 800 from among the locations in which a predetermined item (e.g., at least one item or all items) among respective items i of the received uplink signal quality information on the map indicated by the propagation information $S_{MF}$ attains a value equal to or greater than Yi (where Yi is a real number greater than zero) determined by a user that owns the mobile station 900, and output the calculated direction and distance as the terminal display information $S_{MCA}$.

The propagation information display unit 907 inputs and displays the terminal display information $S_{MCA}$ on a terminal screen.

The uplink pilot control signal extracting unit 908 inputs the first to $S^{th}$ mobile station demodulated signals $S_{MDEM-1}$ to $S_{MDEM-S}$, and extracts a received uplink pilot control signal $S_{MPC}$. The mobile station identification number generating unit 909 generates a predetermined mobile station identification number $S_{MID}$ of the mobile station 900. The position information generating unit 910 outputs a position of the mobile station 900 measured using the GPS as position information $S_{ML}$. The uplink pilot signal generating unit 911 inputs the received uplink pilot control signal $S_{MPC}$ and the mobile station identification number $S_{MID}$. In addition, the uplink pilot signal generating unit 911 generates a pilot signal $S_{MTP}$ using a pilot signal pattern of a pattern number corresponding to the same mobile station identification number as the mobile station identification number $S_{MID}$ in the received uplink pilot control signal $S_{MPC}$. The signal multiplexer 912 multiplexes the pilot signal $S_{MTP}$, the mobile station identification number $S_{MID}$, and the position information $S_{ML}$, and outputs as many uplink multiplexed signals $S_{MM-1}$ to $S_{MM-S}$ as the transmitting antennas 915-1 to 915-S. The first to $S^{th}$ modulator 913-1 to 913-S modulate the first to $S^{th}$ uplink multiplexed signals $S_{MM-1}$ to $S_{MM-S}$, and output first to $S^{th}$ transmitted uplink signals $S_{MTX-1}$ to $S_{MTX-S}$, respectively. The first to $S^{th}$ transmitted uplink signals $S_{MTX-1}$ to $S_{MTX-S}$ are transmitted to the base station 800 from the first to $S^{th}$ transmitting antennas 915-1 to 915-S, respectively.

In this embodiment, the above-stated operation makes it possible for the base station 800 to provide each mobile station with the propagation information having the positions of the mobile stations 900-1 to 900-M correspond to the propagation path correlations among the mobile stations 900-1 to 900-M at the respective positions in advance. Each mobile station can, therefore, arrive at the location for efficiently providing a good received signal quality.

Fifth Embodiment

Figure 11:
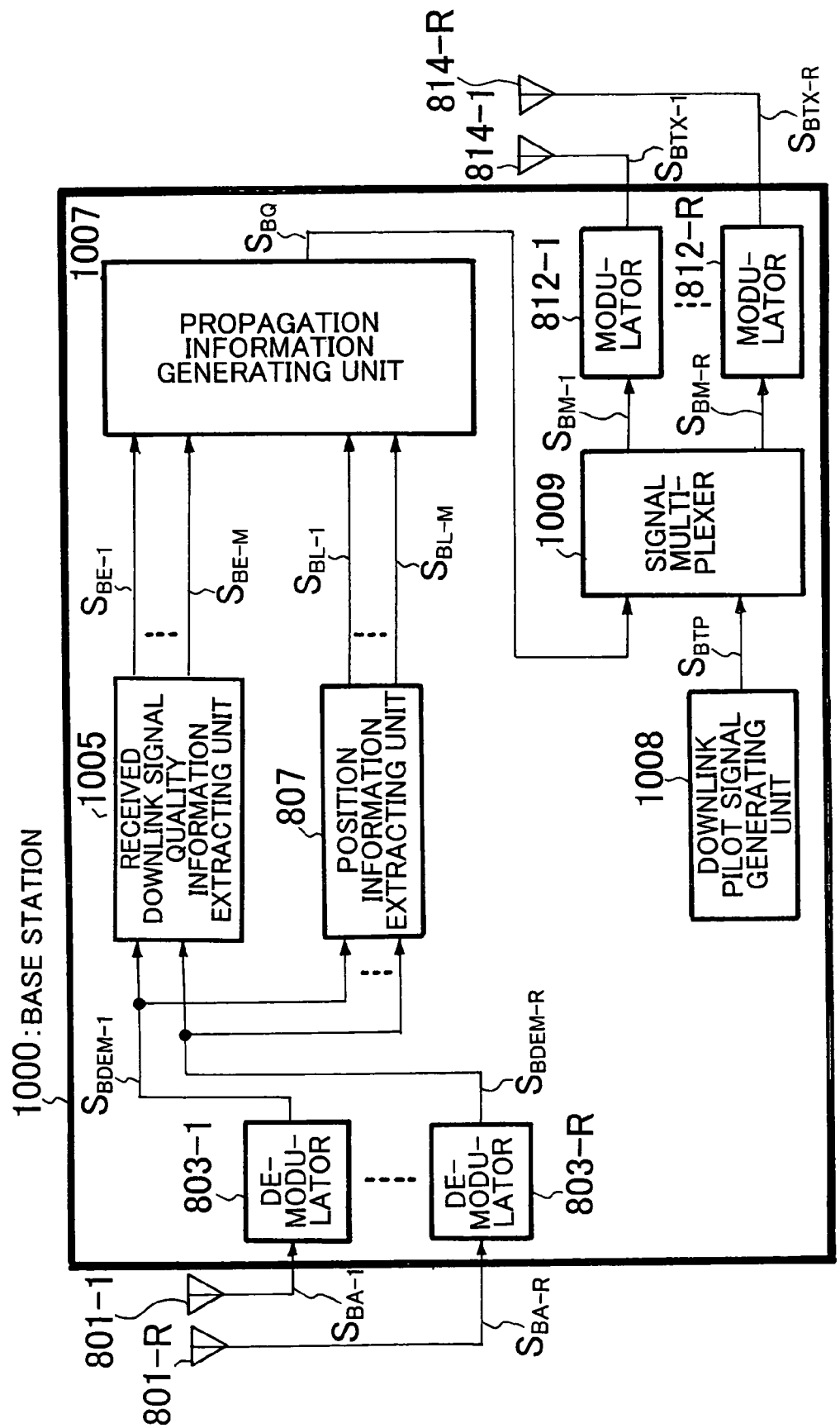
FIG. 11 is a block diagram of a configuration of a base station according to a fifth embodiment of the present invention.
Figure 12:
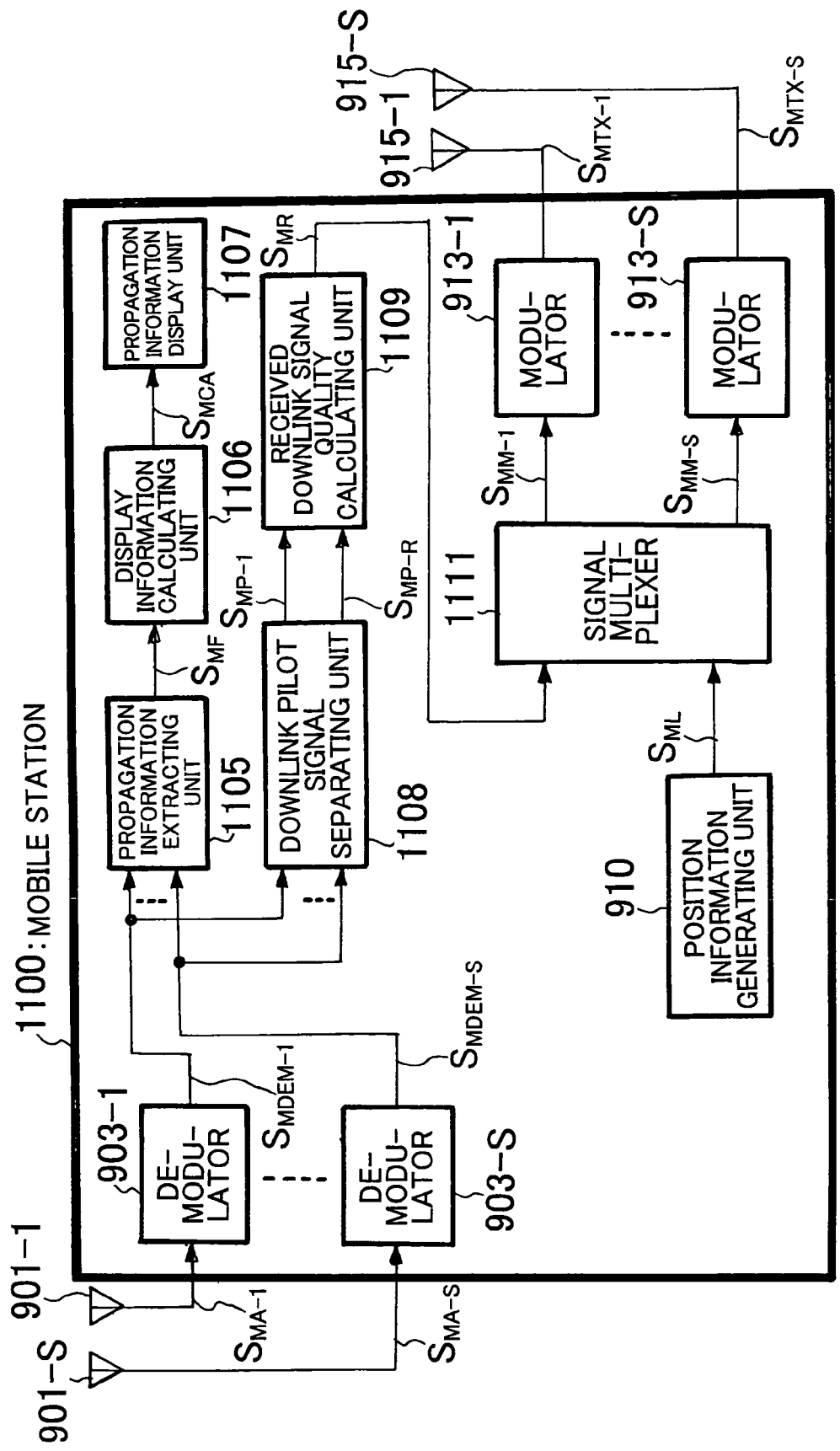
FIG. 12 is a block diagram of a configuration of a mobile station according to the fifth embodiment.

The fifth embodiment of the present invention is based on the MIMO transmission method and intended to solve the disadvantages described in the first paragraph of the fourth embodiment. FIG. 11 is a block diagram of a configuration of a base station according to the fifth embodiment of the present invention. FIG. 12 is a block diagram of a configuration of a mobile station according to the fifth embodiment. A block diagram of a wireless transmission system according to the fifth embodiment is the same as that according to the fourth embodiment shown in FIG. 10.

Referring to FIG. 11, a base station 1000 includes first to $R^{th}$ (where R is a natural number) receiving antennas 801-1 to 801-R, first to $R^{th}$ demodulators 803-1 to 803-R, a received downlink signal quality information extraction unit 1005, a position information extracting unit 807, a propagation information generating unit 1007, a downlink pilot signal generating unit 1008, a signal multiplexer 1009, first to $R^{th}$ modulators 812-1 to 812-R, and first to $R^{th}$ transmitting antennas 814-1 to 814-R.

In the base station 1000, the first to $R^{th}$ demodulators 803-1 to 803-R demodulate first to $R^{th}$ received signals $S_{BA-1}$ to $S_{BA-R}$ received by the first to $R^{th}$ receiving antenna 801-1 to 801-R, and outputs first to $R^{th}$ base station demodulated signals $S_{BDEM-1}$ to $S_{BDEM-R}$.

The received downlink signal quality information extracting unit 1005 inputs the first to $R^{th}$ base station demodulated signals $S_{BDEM-1}$ to $S_{BDEM-R}$, and extracts and outputs first to $M^{th}$ received downlink signal quality information $S_{BE-1}$ to $S_{BE-M}$.

The position information extracting unit 807 inputs the first to $R^{th}$ base station demodulated signals $S_{BDEM-1}$ to $S_{BDEM-R}$, and extracts first to $M^{th}$ received signal position information $S_{BL-1}$ to $S_{BL-M}$.

The propagation information generating unit 1007 inputs the first to $M^{th}$ received downlink signal quality information $S_{BE-1}$ to $S_{BE-M}$ and the first to $M^{th}$ received signal position information $S_{BL-1}$ to $S_{BL-M}$. In addition, the propagation information generating unit 1007 generates quality-position correspondence information having the first to $M^{th}$ received signal position information $S_{BL-1}$ to $S_{BL-M}$ correspond to the first to $M^{th}$ received downlink signal quality information $S_{BE-1}$ to $S_{BE-M}$, respectively, and outputs the generated quality-position correspondence information as propagation information $S_{BQ}$.

The downlink pilot signal generating unit 1008 generates a downlink pilot signal $S_{BTP}$.

The signal multiplexer 1009 multiplexes the propagation information $S_{BQ}$ with the downlink pilot signal $S_{BTP}$, and outputs as many first to $R^{th}$ downlink multiplexed signals $S_{BM-1}$ to $S_{BM-R}$ as the transmitting antennas 814-1 to 814-R. The first to $R^{th}$ modulators 812-1 to 812-R modulate the first to $R^{th}$ downlink multiplexed signal $S_{BM-1}$ to $S_{BM-R}$, and outputs first to $R^{th}$ transmitted downlink signals $S_{BTX-1}$ $S_{BTX-R}$, respectively. The first to $R^{th}$ transmitted downlink signals $S_{BTX-1}$ to $S_{BTX-R}$ are transmitted from the first to $R^{th}$ transmitting antenna 814-1 to 814-R to the first to $M^{th}$ mobile stations.

Referring to FIG. 12, a mobile station 1100 includes first to $S^{th}$ (where S is a natural number) receiving antennas 901-1 to 901-S, first to $S^{th}$ demodulators 903-1 to 903-S, a propagation information extracting unit 1105, a display information calculating unit 1106, a propagation information display unit 1107, a downlink pilot signal separating unit 1108, a received downlink signal quality calculating unit 1109, a position information generating unit 910, a signal multiplexer 1111, first to $S^{th}$ modulators 913-1 to 913-S, and first to $S^{th}$ transmitting antennas 915-1 to 915-S.

In the mobile station 1100, the first to $S^{th}$ demodulators 903-1 to 903-S demodulate first to $S^{th}$ received signals $S_{MA-1}$ to $S_{MA-S}$ received by the first to $S^{th}$ receiving antennas 901-1 to 901-S and transmitted from the base station 1000, and outputs first to $S^{th}$ mobile station demodulated signals $S_{MDEM-1}$ to $S_{MDEM-S}$, respectively. The propagation information extracting unit 1105 inputs the first to $S^{th}$ mobile station demodulated signals $S_{MDEM-1}$ to $S_{MDEM-S}$, and extracts propagation information $S_{MF}$.

The display information calculating unit 1106 inputs the propagation information $S_{MF}$. In addition, the display information calculating unit 1106 outputs map information having first to $M^{th}$ received uplink signal quality information $S_{BR-1}$ to $S_{BR-M}$ plotted at positions indicated by first to $M^{th}$ position information $S_{BL-1}$ to $S_{BL-M}$, respectively, as terminal display information $S_{MCA}$. Further, the display information calculating unit 1106 may alternatively or additionally input the propagation information $S_{MF}$. In addition, the display information calculating unit 1106 may calculate a direction and a distance of a most proximate location to the mobile station 1100 from among the locations in which a predetermined item (e.g., at least one item or all items) among respective items i of the received downlink signal quality information on the map indicated by the propagation information $S_{MF}$ attains a value equal to or greater than Yi (where Yi is a real number greater than zero) determined by a user that owns the mobile station 1100, and output the calculated direction and distance as the terminal display information $S_{MCA}$. The propagation information display unit 1107 inputs and displays the terminal display information $S_{MCA}$ on a terminal screen.

The downlink pilot signal separating unit 1108 inputs the first to $S^{th}$ mobile station demodulated signals $S_{MDEM-1}$ to $S_{MDEM-S}$, and separates and outputs received downlink pilot signals $S_{MP-1}$ to $S_{MR-R}$. The received downlink signal quality calculating unit 1109 inputs the received downlink signals $S_{MP-1}$ to $S_{MP-R}$, calculates at least one of a received signal power in the mobile station 1100, a ratio of the received signal power to an interference power in the mobile station 1100, and correlations among the transmitting antennas in the base station and outputs a calculation result as received downlink signal quality information $S_{MR}$. The position information generating unit 910 outputs a position of the mobile station 1100 measured using the GPS as position information $S_{ML}$. The signal multiplexer 1111 multiplexes the received downlink signal quality information $S_{MR}$ and the position information $S_{ML}$, and outputs as many first to $S^{th}$ uplink multiplexed signal $S_{MM-1}$ to $S_{MM-S}$ as the transmitting antennas 915-1 to 915-S. The first to $S^{th}$ modulators 913-1 to 913-S modulate the first to $S^{th}$ uplink multiplexed signals $S_{MM-1}$ to $S_{MM-S}$, and output first to $S^{th}$ transmitted uplink signals $S_{MTX-1}$ to $S_{MTX-S}$, respectively. The first to $S^{th}$ transmitted uplink signals $S_{MTX-1}$ to $S_{MTX-S}$ are transmitted to the base station 1000 from the first to $S^{th}$ transmitting antennas 915-1 to 915-S, respectively.

Referring to FIG. 10, the wireless transmission system 1400 includes the base station 1000 and first to $M^{th}$ mobile stations 1100-1 to 1100-M.

In this embodiment, the above-stated operation makes it possible for the base station 1000 to provide each mobile station with the propagation information having the positions of the mobile stations 1100-1 to 1100-M correspond to the received downlink signal qualities at the respective positions in advance. Each mobile station can, therefore, arrive at the location for efficiently providing a good received signal quality.

Sixth Embodiment

Figure 13:
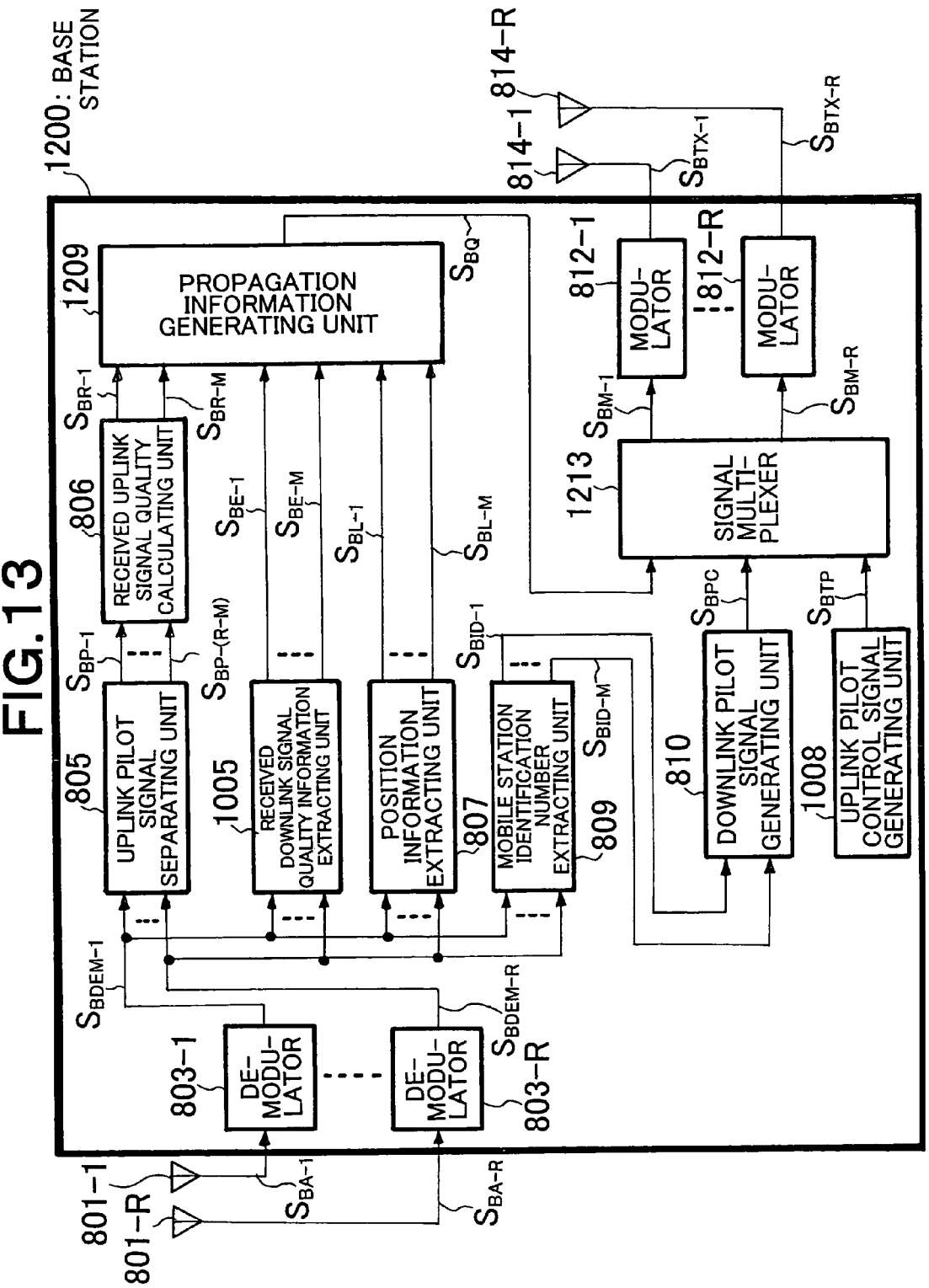
FIG. 13 is a block diagram of a configuration of a base station according to a sixth embodiment of the present invention.
Figure 14:
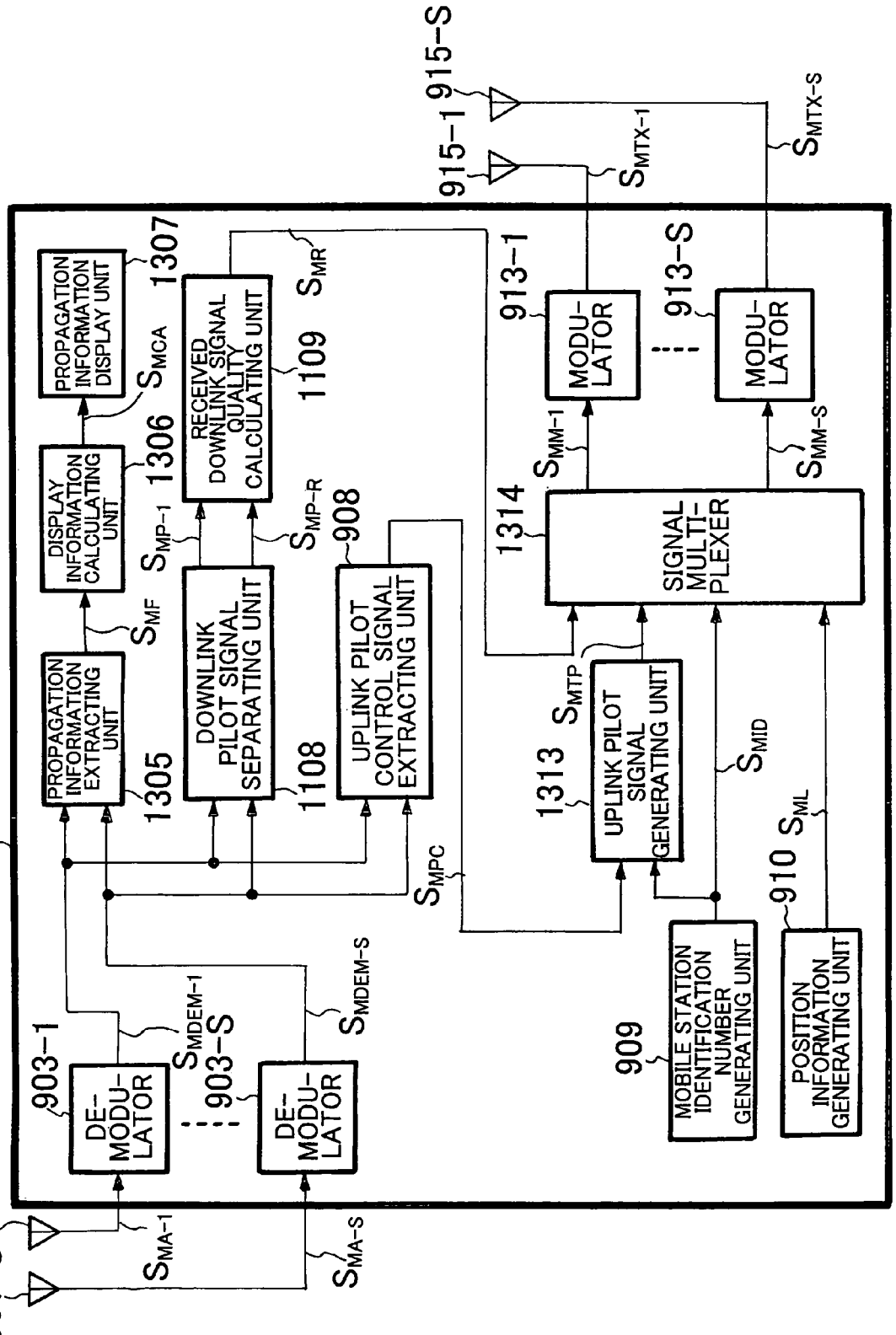
FIG. 14 is a block diagram of a configuration of a mobile station according to the sixth embodiment.

The sixth embodiment of the present invention is based on the MIMO transmission method and intended to solve the disadvantages described in the first paragraph of the fourth embodiment. FIG. 13 is a block diagram of a configuration of a base station according to the sixth embodiment of the present invention. FIG. 14 is a block diagram of a configuration of a mobile station according to the sixth embodiment. A block diagram of a wireless transmission system according to the sixth embodiment is the same as that according to the fourth embodiment shown in FIG. 10.

Referring to FIG. 13, a base station 1200 includes first to $R^{th}$ (where R is a natural number) receiving antennas 801-1 to 801-R, first to $R^{th}$ demodulators 803-1 to 803-R, an uplink pilot signal separating unit 805, an uplink received signal quality calculating unit 806, a received downlink signal quality information extracting unit 1005, a position information extracting unit 807, a mobile station identification number extracting unit 809, a propagation information generating unit 1209, an uplink pilot control signal generating unit 810, an downlink pilot signal generating unit 1008, a signal multiplexer 1213, first to $R^{th}$ modulators 812-1 to 812-R, and first to $R^{th}$ transmitting antennas 814-1 to 814-R.

In the base station 1200, the first to $R^{th}$ demodulators 803-1 to 803-R demodulate first to $R^{th}$ received signals $S_{BA-1}$ to $S_{BA-R}$ received by the first to $R^{th}$ receiving antenna 801-1 to 801-R, and outputs first to $R^{th}$ base station demodulated signals $S_{BDEM-1}$ to $S_{BDEM-R}$. The uplink pilot signal separating unit 805 inputs the first to $R^{th}$ base station demodulated signals $S_{BDEM-1}$ to $S_{BDEM-R}$, and separates uplink pilot signals from the first to $M^{th}$ mobile stations for each of the first to $R^{th}$ base station demodulated signals $S_{BDEM-1}$ to $S_{BDEM-R}$. In addition, the uplink pilot signal separating unit 805 outputs received uplink pilot signals $S_{BP-1}$ to $S_{BP-(R*M)}$ of first to $(R*M)^{th}$, i.e., (R*M) sequences in all.

The received uplink signal quality calculating unit 806 inputs the first to $(R*M)^{th}$ received uplink pilot signals $S_{BP-1}$ to $S_{BR-(R*M)}$. In addition, the received uplink signal quality calculating unit 806 outputs first to $M^{th}$, i.e., M in all, received uplink signal quality information $S_{BR-1}$ to $S_{BR-M}$, while setting a maximum of propagation path correlations between an $i^{th}$ mobile station and the other (M-1) mobile stations as $i^{th}$ received uplink signal quality information $S_{BR-i}$.

In the above description, the received uplink signal quality calculating unit 806 sets the maximum of the propagation path correlations between the $i^{th}$ mobile station and the other (M-1) mobile stations as the $i^{th}$ received uplink signal quality information $S_{BR-i}$. Alternatively, an average of the propagation path correlations between the $i^{th}$ mobile station and the other (M-1) mobile stations may be set as the $i^{th}$ received uplink signal quality information $S_{BR-}$.

Further, the received uplink. signal quality information $S_{BR-1}$ to $S_{BR-M}$ output from the received uplink signal quality calculating unit 806 are set as the propagation path correlations among the mobile stations. Alternatively, if the number S of the transmitting antennas of each base station is an integer equal to or greater than 2, the received uplink signal quality information $S_{BR-1}$ to $S_{BR-M}$ may be set as correlations among the transmitting antennas in the respective mobile stations.

Furthermore, the received uplink signal quality calculating unit 806 may additionally or alternatively input the first to $(R*M)^{th}$ received uplink pilot signals $S_{BP-1}$ to $S_{BR-(R*M)}$. In addition, the received uplink signal quality calculating unit 806 may calculate at least either received signal powers in the base station 1200 for the respective first to $M^{th}$ mobile stations or ratios of the received signal powers to interference powers in the base station 1200 for the respective first to $M^{th}$ mobile stations, and output calculation results as the first to $M^{th}$ received uplink signal quality information $S_{BR-1}$ to $S_{BR-M}$.

The received downlink signal quality information extracting unit 1005 inputs the first to $R^{th}$ base station demodulated signals $S_{BDEM-1}$ to $S_{BDEM-R}$, and extracts and outputs first to $M^{th}$ received downlink signal quality information $S_{BE-1}$ to $S_{BE-M}$.

The position information extracting unit 807 inputs the first to $R^{th}$ base station demodulated signals $S_{BDEM-1}$ to $S_{BDEM-R}$, and extracts first to $M^{th}$ received signal position information $S_{BL-1}$ to $S_{BL-M}$.

The propagation information generating unit 1209 inputs the first to $M^{th}$ received uplink signal quality information $S_{BR-1}$ to $S_{BR-M}$, the first to $M^{th}$ received downlink signal quality information $S_{BE-1}$ to $S_{BE-M}$, and the first to $M^{th}$ received signal position information $S_{BL-1}$ to $S_{BL-M}$. In addition, the propagation information generating unit 1209 generates quality-position correspondence information having the first to $M^{th}$ received signal position information $S_{BL-1}$ to $S_{BL-M}$, the first to $M^{th}$ received downlink signal quality information $S_{BE-1}$ to $S_{BE-M}$, and the first to $M^{th}$ received uplink signal quality information $S_{BR-1}$ to $S_{BR-M}$ correspond to one another, respectively, and outputs the quality-position correspondence information as propagation information $S_{BQ}$.

The mobile station identification number extracting unit 809 inputs the first to $R^{th}$ base station demodulated signals $S_{BDEM-1}$ to $S_{BDEM-R}$, and extracts first to $M^{th}$ received signal mobile station identification numbers $S_{BID-1}$ to $S_{BID-M}$. The uplink pilot control signal generating unit 810 determines pattern numbers of pilot signals used by the first to the $M^{th}$ mobile stations in an order of starting communication with the base station 1200 based on the first to $M^{th}$ received signal mobile station identification numbers $S_{BID-1}$ to $S_{BID-M}$. In addition, the uplink pilot control signal generating unit 810 generates an uplink pilot control signal $S_{BPC}$ having the pattern numbers of the pilot signals used by the first to $M^{th}$ mobile stations correspond to the first to $M^{th}$ mobile station identification numbers $S_{BID-1}$ to $S_{BID-M}$, respectively.

The downlink pilot signal generating unit 1008 generates and outputs a downlink pilot signal $S_{BTP}$.

The signal multiplexer 1213 multiplexes the propagation information $S_{BQ}$, the uplink pilot control signal $S_{BPC}$, and the downlink pilot signal $S_{BTP}$, and outputs as many first to $R^{th}$ downlink multiplexed signals $S_{BM-1}$ to $S_{BM-R}$ as the transmitting antennas 841-1 to 814-R. The first to $R^{th}$ modulators 812-1 to 812-R modulate the first to $R^{th}$ downlink multiplexed signals $S_{BM-1}$ to $S_{BM-R}$, and the first to $R^{th}$ output transmitted downlink signals $S_{BTX-1}$ to $S_{BTX-R}$, respectively. The first to $R^{th}$ transmitted downlink signals $S_{BTX-1}$ to $S_{BTX-R}$ are transmitted from the first to $R^{th}$ transmitting antenna 814-1 to 814-R to the first to the $M^{th}$ mobile stations.

Referring to FIG. 14, a mobile station 1300 includes first to $S^{th}$ receiving antennas 901-1 to 901-S (where S is a natural number), first to $S^{th}$ demodulators 903-1 to 903-S, a propagation information extracting unit 1305, a display information calculating unit 1306, a propagation information display unit 1307, a downlink pilot signal separating unit 1108, a received downlink signal quality calculating unit 1109, an uplink pilot control signal extracting unit 908, a mobile station identification number generating unit 909, a position information generating unit 910, an uplink pilot signal generating unit 1313, a signal multiplexer 1314, first to $S^{th}$ modulators 913-1 to 913-S, and first to $S^{th}$ transmitting antennas 915-1 to 915-S.

In the mobile station 1300, the first to $S^{th}$ demodulators 903-1 to 903-S demodulate received signals $S_{MA-1}$ to $S_{MA-S}$ received by the first to $S^{th}$ receiving antenna 901-1 to 901-S and transmitted from the base station 1200, and output first to $S^{th}$ mobile station demodulated signals $S_{MDEM-1}$ to $S_{MDEM-S}$. The propagation information extracting unit 1305 inputs the first to $S^{th}$ mobile station demodulated signals $S_{MDEM-1}$ to $S_{MDEM-S}$, and extracts propagation information $S_{MF}$. The display information calculating unit 1306 inputs the propagation information $S_{MF}$. In addition, the display information calculating unit 1306 outputs map information having first to $M^{th}$ received uplink signal quality information $S_{BR-1}$ to $S_{BR-M}$ and first to $M^{th}$ received downlink signal quality information $S_{BE-1}$ to $S_{BE-M}$ plotted at positions indicated by first to $M^{th}$ position information $S_{BL-1}$ to $S_{BL-M}$, respectively, as terminal display information $S_{MCA}$. Further, the display information calculating unit 1306 may alternatively or additionally input the propagation information $S_{MF}$. In addition, the display information calculating unit 1306 may calculate a direction and a distance of a most proximate location to the mobile station 1300 from among the locations in which a predetermined item (e.g., at least one item or all items) among respective items i of the received downlink signal quality information on the map indicated by the propagation information $S_{MF}$ attains a value equal to or greater than Yi (where Yi is a real number greater than zero) determined by a user that owns the mobile station 1300, and in which a predetermined item (e.g., at least one item or all items) among respective items j of the received uplink signal quality information on the map attains a value equal to or greater than Zi (where Zi is a real number greater than zero) determined by the user that owns the mobile station 1300, and output the calculated direction and distance as the terminal display information $S_{MCA}$. The propagation information display unit 1307 inputs and displays the terminal display information $S_{MCA}$ on a terminal screen.

The downlink pilot signal separating unit 1108 inputs the first to $S^{th}$ mobile station demodulated signals $S_{MDEM-1}$ to $S_{MDEM-S}$, and separates and outputs received downlink pilot signals $S_{MP-1}$ to $S_{MR-R}$. The received downlink signal quality calculating unit 1109 inputs the received downlink signals $S_{MP-1}$ to $S_{MP-R}$, calculates at least one of a received signal power in the mobile station 1300, a ratio of the received signal power to an interference power in the mobile station 1300, and correlations among the transmitting antennas in the base station 1200 and outputs a calculation result as received downlink signal quality information $S_{MR}$.

The uplink pilot control signal extracting unit 908 inputs the first to $S^{th}$ mobile station demodulated signals $S_{MDEM-1}$ to $S_{MDEM-S}$, and extracts a received uplink pilot control signal $S_{MPC}$. The mobile station identification number generating unit 909 generates a predetermined mobile station identification number $S_{MID}$ of the mobile station 1300. The position information generating unit 910 outputs a position of the mobile station 1300 measured using the GPS as position information $S_{ML}$. The uplink pilot signal generating unit 1313 inputs the received uplink pilot control signal $S_{MPC}$ and the mobile station identification number $S_{MID}$. In addition, the uplink pilot signal generating unit 1313 generates a pilot signal $S_{MTP}$ using a pilot signal pattern of a pattern number corresponding to the same mobile station identification number as the mobile station identification number $S_{MID}$ in the received uplink pilot control signal $S_{MPC}$. The signal multiplexer 1314 multiplexes the received downlink signal quality $S_{MR}$, the pilot signal $S_{MTP}$, the mobile station identification number $S_{MID}$, and the position information $S_{ML}$, and outputs as many first to $S^{th}$ uplink multiplexed signals $S_{MM-1}$ to $S_{MM-S}$ as the transmitting antennas 915-1 to 915-S. The first to $S^{th}$ modulator 913-1 to 913-S modulate the first to $S^{th}$ uplink multiplexed signals $S_{MM-1}$ to $S_{MM-S}$, and output first to $S^{th}$ transmitted uplink signals $S_{MTX-1}$ to $S_{MTX-S}$, respectively. The first to $S^{th}$ transmitted uplink signals $S_{MTX-1}$ to $S_{MTX-S}$ are transmitted to the base station 1200 from the first to $S^{th}$ transmitting antennas 915-1 to 915-S, respectively.

Referring to FIG. 10, the wireless transmission system 1400 includes the base station 1200 and first to $M^{th}$ mobile stations 1300-1 to 1300-M.

In this embodiment, the above-stated operation makes it possible for the base station 1200 to provide each mobile station with the propagation information having the positions of the mobile stations 1300-1 to 1300-M correspond to the propagation path correlations among the mobile stations 1300-1 to 1300-M at the respective positions in advance. Each mobile station can, therefore, arrive at the location for efficiently providing a good received signal quality.

Seventh Embodiment

Figure 15:
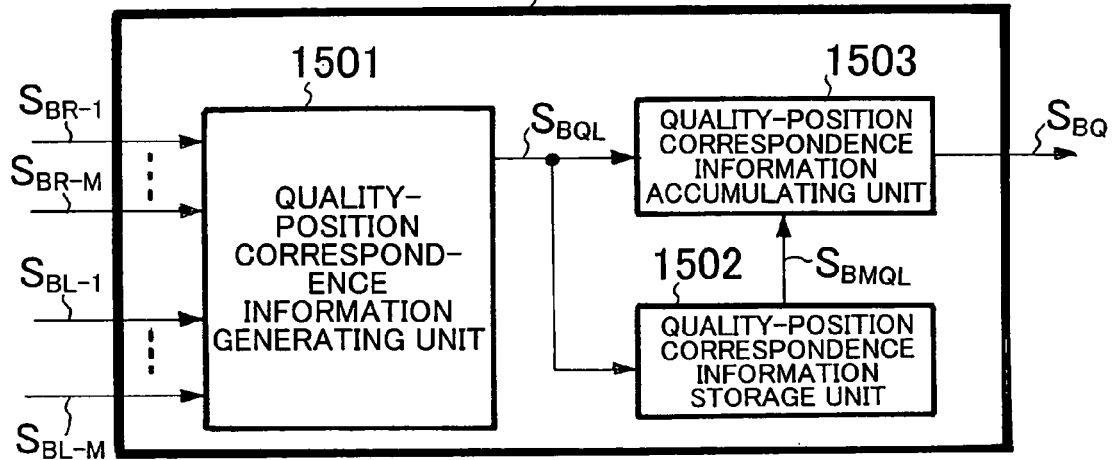
FIG. 15 is a block diagram of a configuration of a propagation information generating unit according to a seventh embodiment of the present invention.

FIG. 15 is a block diagram of a configuration of a propagation information generating unit according to the seventh embodiment of the present invention. A base station, each mobile station, and a wireless transmission system according to the seventh embodiment are the same in configuration as those shown in FIGS. 8, 9, and 10 according to the fourth embodiment, respectively.

Referring to FIG. 15, a propagation information generating unit 808A includes a quality-position correspondence information generating unit 1501, a quality-position correspondence information storage unit 1502, and a quality-position correspondence information accumulating unit 1503.

The quality-position correspondence information generating unit 1501 inputs the first to $M^{th}$ received uplink signal quality information $S_{BR-1}$ to $S_{BR-M}$ and the first to $M^{th}$ received signal position information $S_{BL-1}$ to $S_{BL-M}$ at a $W^{th}$ time (where W is a natural number). In addition, the quality-position correspondence information generating unit 1501 generates $W^{th}$ quality-position correspondence information $S_{BQL}$ having the first to $M^{th}$ received signal position information $S_{BL-1}$ to $S_{BL-M}$ correspond to the first to $M^{th}$ received uplink signal quality information $S_{BR-1}$ to $S_{BR-M}$, respectively. The quality-position correspondence information storage unit 1502 stores the $W^{th}$ quality-position correspondence information $S_{BQL}$ in a storage device within the quality-position correspondence information storage unit 1502. In addition, the quality-position correspondence information storage unit 1502 outputs previously generated $(W-X+1)^{th}$, $(W-X+2)^{th}$, ... and $(W-1)^{th}$ (where X is a natural number equal to or smaller than W) quality-position correspondence information $S_{BMQL}$. The quality-position correspondence information accumulating unit 1503 inputs the $W^{th}$ quality-position correspondence information $S_{BMQL}$ and the $(W-X+1)^{th}$, $(W-X+2)^{th}$, ... and $(W-1)^{th}$ quality-position correspondence information $S_{BMQL}$, i.e., X pieces of quality-position correspondence information in all. In addition, the quality-position correspondence information accumulating unit 1503 accumulates pieces of information of combinations of maximum (X*M) pieces of position information and the received signal quality information, and averages the received signal quality information per equal position, thereby generating new quality-position accumulating information. The quality-position correspondence information accumulating unit 1503 outputs the generated new quality-position accumulating information as propagation information $S_{BQ}$.

By performing the above-stated operation, if the base station can acquire the received signal quality information at a plurality of positions from one mobile station by movement of the mobile station, it is possible to generate detailed quality-position correspondence information by converting the X pieces of quality-position correspondence information generated at different times as stated above.

The propagation information generating unit 106 according to the first embodiment, the propagation information generating unit 405 according to the second embodiment, the propagation information generating unit 607 according to the third embodiment, the propagation information generating unit 1007 according to the fifth embodiment or the propagation information generating unit 1209 according to the sixth embodiment may be configured similarly to the propagation information generating unit 808A according to this embodiment.

Eighth Embodiment

The eighth embodiment of the present invention is based on the MIMO transmission method, and intended to solve the disadvantages described in the first paragraph of the fourth embodiment.

Figure 16:
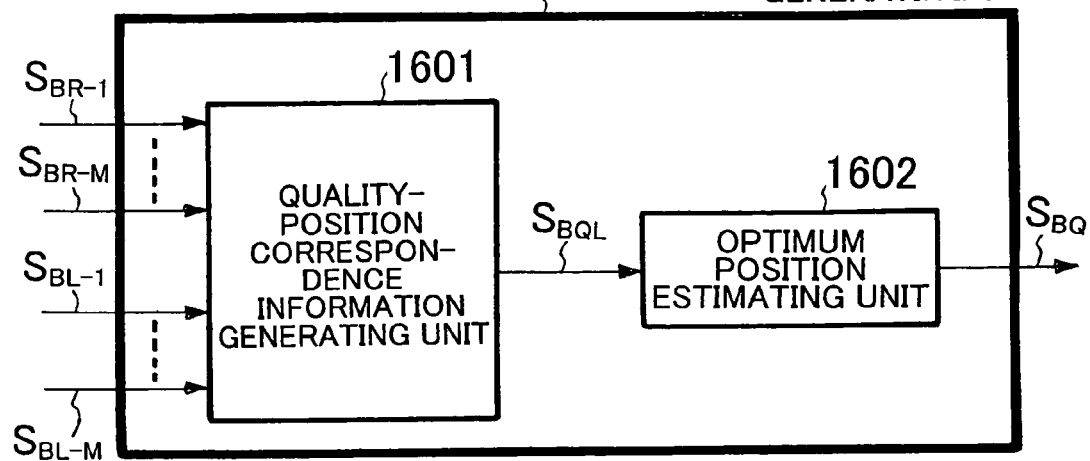
FIG. 16 is a block diagram of a configuration of a propagation information generating unit according to an eighth embodiment of the present invention.

FIG. 16 is a block diagram of a configuration of a propagation information generating unit according to the eighth embodiment of the present invention. A base station, each mobile station, and a wireless transmission system according to the eighth embodiment are the same in configuration as those shown in FIGS. 8, 9, and 10 according to the fourth embodiment, respectively.

Referring to FIG. 16, a propagation information generating unit 808B includes a quality-position correspondence information generating unit 1601 and an optimum position estimating unit 1602.

In the propagation information generating unit 808B, the quality-position correspondence information generating unit 1601 inputs the first to $M^{th}$ received uplink signal quality information $S_{BR-1}$ to $S_{BR-M}$ and the first to $M^{th}$ received signal position information $S_{BL-1}$ to $S_{BL-M}$. In addition, the quality-position correspondence information generating unit 1601 generates quality-position correspondence information $S_{BQL}$ having the first to $M^{th}$ received signal position information $S_{BL-1}$ to $S_{BL-M}$ correspond to the first to $M^{th}$ received uplink signal quality information $S_{BR-1}$ to $S_{BR-M}$, respectively. The optimum position estimating unit 1602 inputs the quality-position correspondence information $S_{BQL}$. In addition, the optimum position estimating unit 1602 estimates a relative positional relationship among the first to $M^{th}$ mobile stations in which received signal qualities in the first to $M^{th}$ mobile stations reach a value equal to or greater than Y (where Y is a real number greater than zero) based on a relative positional relationship among the first to $M^{th}$ mobile stations and the first to $M^{th}$ received signal quality information $S_{BR-1}$ to $S_{BR-M}$. Further, the optimum position estimating unit 1602 outputs directions and distances for moving the first to $M^{th}$ mobile stations as propagation information $S_{BQ}$.

An instance in which the number M of mobile stations is four, and in which the optimum position estimating unit 1602 estimates first to $M^{th}$ pieces of optimum position information will next be described with reference to FIGS. 17 and 18.

Figure 17:
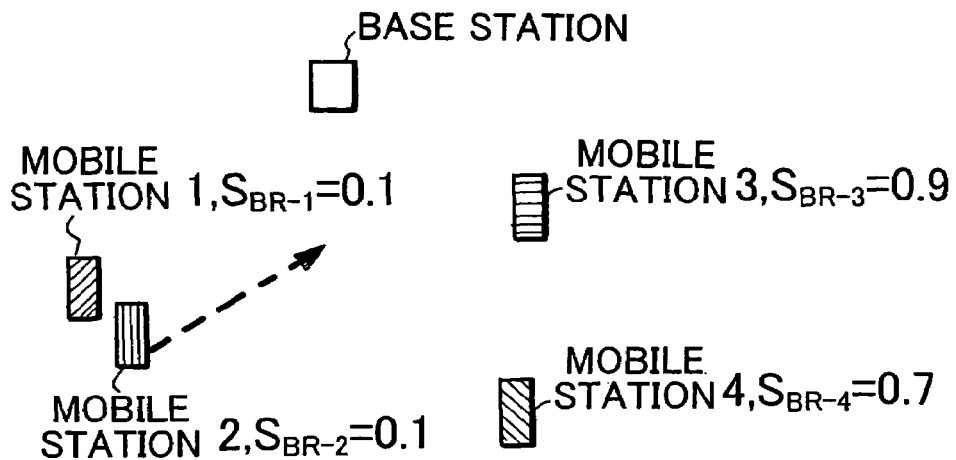
FIG. 17 shows a base station and mobile stations before a positional relationship among the mobile stations is changed according to the eighth embodiment.

FIG. 17 shows an example of plotting the relative positional relationship among the first to fourth mobile stations and the first to fourth received signal quality information $S_{BL-1}$ to $S_{BL-4}$ based on data on the quality-position correspondence information $S_{BQL}$. In the example of FIG. 17, the first and second mobile stations are proximate to each other and a correlation between the first and second mobile stations is high. Due to this, the first and second received signal quality information $S_{BR-1}$ and $S_{BR-2}$ such as the received signal powers or the ratios of the received signal powers to interference powers are lower than the third and fourth received signal quality information $S_{BR-3}$ and $S_{BR-4}$.

In this case, the optimum position estimating unit 1602 estimates an intermediate point of a line that connects the mobile station (second mobile station) closer to the mobile station (third mobile station) for providing a highest received signal quality to the third mobile station as an optimum point. In addition, the optimum position estimating unit 1602 calculates a direction and a distance from the second mobile station to the optimum point, and notifies the second mobile station of the calculated direction and distance as the propagation information $S_{BQ}$. The second mobile station displays the propagation information $S_{BQ}$.

Figure 18:
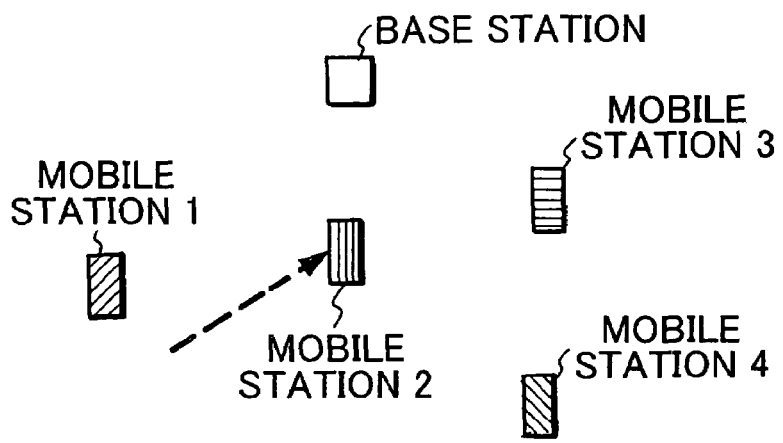
FIG. 18 shows the base station and the mobile stations after the positional relationship among the mobile stations is changed according to the eighth embodiment.

The above-stated operation makes it possible to reduce the correlation between the first and second mobile stations and to improve the received signal qualities in the first and second mobile stations by moving the second mobile station to a position indicated by the propagation information $S_{BQ}$ as shown in FIG. 18. It is noted that the optimum position estimating unit 1602 needs to select, as a location to which the second mobile station is moved, a location that does not greatly influence the received signal qualities in the third and fourth mobile stations in which relatively high received signal qualities are provided.

The propagation information generating unit 1007 according to the fifth embodiment or the propagation information generating unit 1209 according to the sixth embodiment may be configured similarly to the propagation information generating unit 808B according to this embodiment.

Ninth Embodiment

The ninth embodiment of the present invention is based on the MIMO transmission method, and intended to solve the disadvantages described in the first paragraph of the fourth embodiment.

Figure 19:
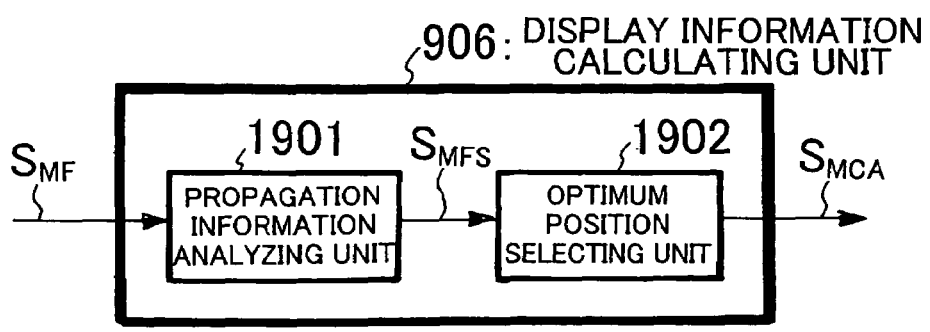
FIG. 19 is a block diagram of a configuration of a display information calculating unit according to a ninth embodiment of the present invention.

FIG. 19 is a block diagram of a configuration of a display information calculating unit 906 in each mobile station according to the ninth embodiment of the present invention. A base station, each mobile station, and a wireless transmission system according to the ninth embodiment are the same in configuration as those shown in FIGS. 8, 9, and 10 according to the fourth embodiment, respectively. This embodiment is based on the seventh embodiment.

Referring to FIG. 19, the display information calculating unit 906 includes a propagation information analyzing unit 1901 and an optimum position selecting unit 1902.

In the display information calculating unit 906, the propagation information analyzing unit 1901 inputs the propagation information $S_{MF}$. In addition, the propagation information analyzing unit 1901 generates map information by mapping information having first to maximum-order (X*M) received signal position information included in the propagation information $S_{MF}$ correspond to first to maximum-order (X*M) received uplink signal quality information, respectively. Further, the propagation information analyzing unit 1901 outputs data obtained by plotting the first to $M^{th}$ position information at the $W^{th}$ time on a map, as analysis information SMFs.

The optimum position selecting unit 1902 inputs the analysis information $S_{MFS}$, and determines a location at which the other mobile stations are not present nearby in an area in which a required received signal quality is attained, as an optimum moving position. In addition, the optimum position selecting unit 1902 calculates a direction of and a distance to the optimum moving position from a position of the mobile station, and outputs the calculated direction and distance as the terminal display information $S_{MCA}$.

An instance in which the number M of mobile stations is four, and in which the display information calculating unit 906 in the second mobile station selects the optimum moving position will next be described with reference to FIGS. 20 and 21.

Figure 20:
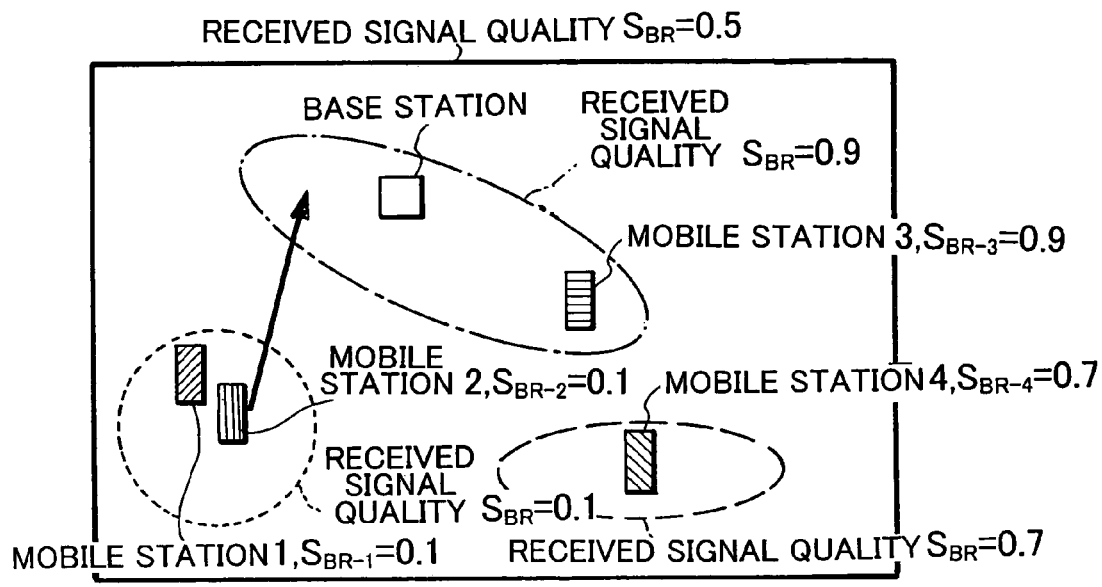
FIG. 20 shows a base station and mobile stations before a positional relationship among the mobile stations is changed according to the ninth embodiment.
Figure 21:
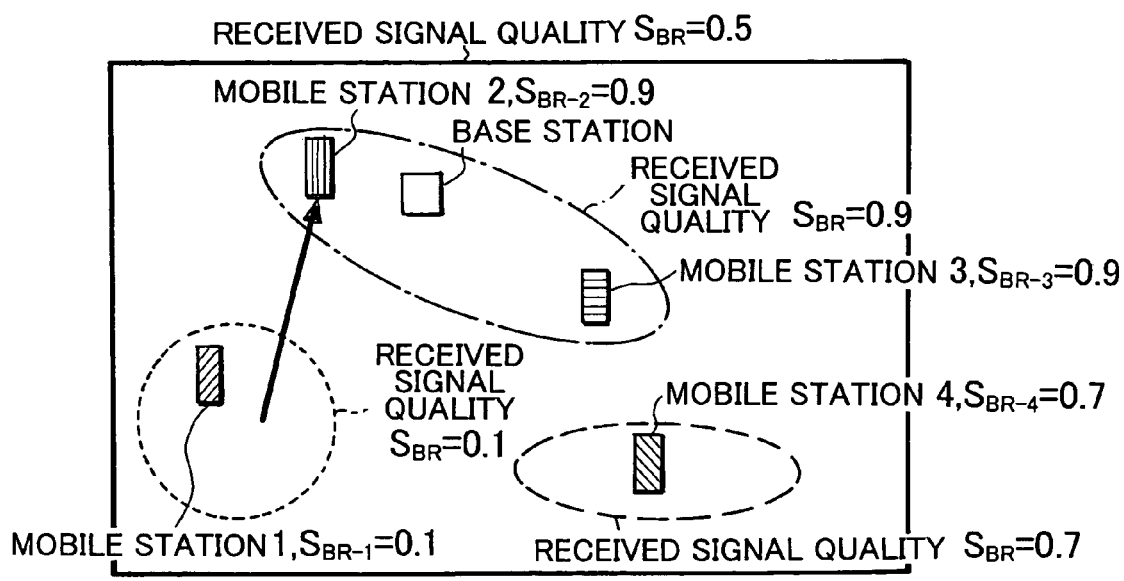
FIG. 21 shows the base station and the mobile stations after the positional relationship among the mobile stations is changed according to the ninth embodiment.
Figure 22:
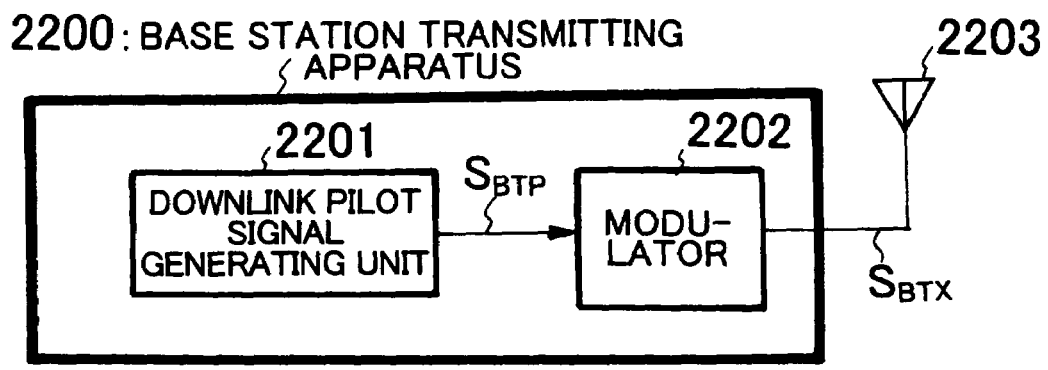
FIG. 22 is a block diagram of a configuration of a conventional base station.
Figure 23:
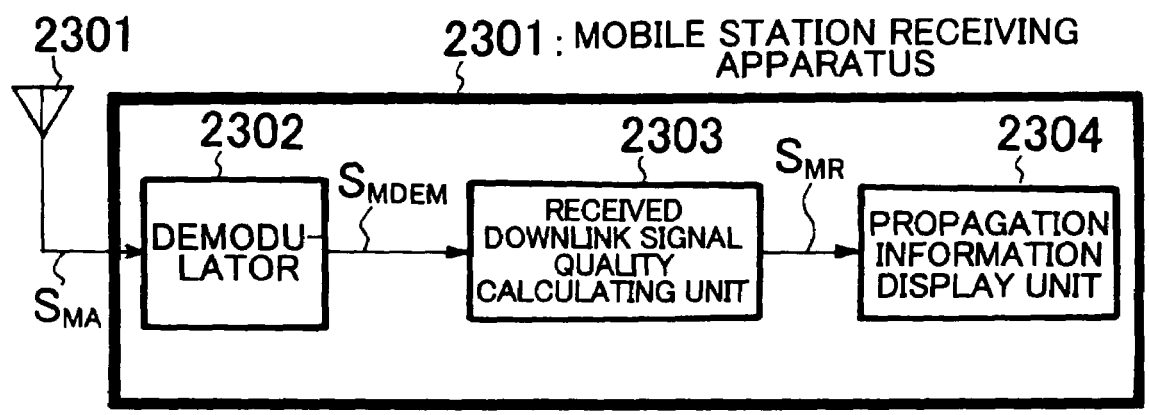
FIG. 23 is a block diagram of a configuration of a conventional mobile station.

FIG. 20 shows an example of a map which is generated from information having the first to maximum-order (X*4) received signal position information $S_{BL-1}$ to $S_{BL-M}$ included in the propagation information $S_{MF}$ correspond to the first to maximum-order (X*4) received uplink signal quality information $S_{BR-1}$ to $S_{BR-M}$, and which represents received signal qualities. FIG. 20 also shows position information on the first to fourth mobile stations. In the example of FIG. 20, the first and second mobile stations are proximate to each other and a correlation between the first and second mobile stations is high. Due to this, the first and second received signal quality information $S_{BR-1}$ and $S_{BR-2}$ such as the received signal powers or the ratios of the received signal powers to interference powers are lower than the third and fourth received signal quality information $S_{BR-3}$ and $S_{BR-4}$.

In this case, if the received signal qualities do not depend on the relative positional relationship among the mobile stations, the received signal qualities of the first and second mobile stations can be improved from 0.1 to 0.9 by moving the second mobile station to an area indicating the received signal quality of 0.9. However, if the correlations among the mobile stations depending on the relative positional relationship among the mobile stations are used as the received signal qualities, then the correlation between the second and fourth mobile station is increased, and the received signal qualities of the second and fourth mobile stations are degraded by moving the second mobile station to the location proximate to the fourth mobile station. Considering this, it is desirable that the second mobile station is moved to a location farthest from the fourth mobile station within the area indicating the received signal quality of 0.9. Accordingly, the optimum position selecting unit 1902 notifies the second mobile station to be moved in an arrow direction shown in FIG. 21.

The above-stated operation makes it possible to efficiently move each mobile station to the location at which the received signal quality is improved by showing positions of the other mobile stations on the map that represents the received signal quality information. In this embodiment, the direction and the distance for moving the mobile station to the determined location are indicated by an arrow on a terminal in the second mobile station. Alternatively, by displaying only the map shown in FIG. 20 (excluding the arrow), a user of the terminal can determine the location to which the mobile terminal is moved. Further, by allowing the propagation information generating unit of the base station to perform the same operation, the base station can determine the location to which the mobile station is moved.

The display information calculating unit 1106 according to the fifth embodiment or the display information calculating unit 1306 according to the sixth embodiment may be configured similarly to the display information calculating unit 906 according to this embodiment.

The ninth embodiment exhibits the following advantages.

Similarly to the first to the third embodiments, if the received signal quality information includes the received signal powers, and the received signal powers do not depend on the relative positional relationship among the mobile stations, the received signal power in each mobile station can be improved by moving the mobile station to the location displayed by the propagation information and providing a good received signal power.

Similarly to the fourth to the sixth embodiments, the following advantages can be exhibited even if a plurality of mobile stations transmit signals with the same frequency at the same time, and the received signal qualities in the respective mobile stations are changed according to the relative positional relationship among the mobile stations. The base station provides each mobile station with the information indicating the propagation path correlations among the mobile stations and the relative positional relationship among the mobile stations as the propagation information in advance. Each mobile station can thereby confirm whether the propagation path correlations cause the reduction in transmission rate. Therefore, each mobile station can be efficiently moved to the location indicating a low propagation path correlation or the location at which the other mobile stations are not present nearby, for which a low propagation path correlation can be predicted, and which provides a good received signal quality, so as to improve the transmission rate.

What is claimed is:

1. A received signal quality display method comprising steps of:
   causing each of a plurality of mobile stations to transmit an uplink pilot signal and position information that indicates a position at which the each mobile station is present to a base station;
   causing the base station to receive the uplink pilot signal and the position information from the each mobile station
   causing the base station to calculate received uplink signal quality information based on the uplink pilot signal received from the each mobile station;
   causing the base station to generate quality-position correspondence information on the plurality of mobile stations by making the received uplink signal quality information correspond to the position information received from the each mobile station;
   causing the base station to transmit the quality-position correspondence information to the each mobile station; and
   causing the each mobile station to display an image generated based on the quality-position correspondence information.

2. The received signal quality display method according to claim 1, further comprising steps of:
   causing the each mobile station to transmit a mobile station identification number for identifying the each mobile station to the base station;
   causing the base station to generate an uplink pilot control signal, in which a correspondence between the each mobile station and a pattern of an uplink pilot signal to be transmitted by the each mobile station is described, based on the mobile station identification number received from the each mobile station; and
   causing the base station to transmit the uplink pilot control signal to the each mobile station, wherein
   at the step of causing the each mobile station to transmit the uplink pilot signal and the position information indicating the position at which the each mobile station is present to the base station, the each mobile station transmits, as the uplink pilot signal, the uplink pilot signal having the pattern designated by the uplink pilot control signal to the base station.

3. The received signal quality display method according to claim 1, further comprising a step of:

causing the each mobile station to generate map information on a plurality of positions based on the quality-position correspondence information, the map information representing a correspondence between the position and the received uplink signal quality, wherein at the step of causing the each mobile station to display the image generated based on the quality-position correspondence information, the each mobile station displays, as the image, an image representing the map information.

4. The received signal quality display method according to claim 1, further comprising a step of:

causing the each mobile station to generate map information representing a correspondence between a position and the received uplink signal quality for the position indicated by the map information included in the quality-position correspondence information at each of a plurality of times, wherein at the step of causing the each mobile station to display the image generated based on the quality-position correspondence information, the each mobile station displays, as the image, an image representing the map information.

5. The received signal quality display method according to claim 1, further comprising a step of:

causing the each mobile station to generate proximate location information indicating a most proximate location to a present position among locations at which a received uplink signal quality represented by the received uplink signal quality information exceeds a predetermined quality, based on the quality-position correspondence information, wherein at the step of causing the each mobile station to display the image generated based on the quality-position correspondence information, the each mobile station displays, as the image, an image representing the proximate location information.

6. The received signal quality display method according to claim 1, wherein at the step of causing the base station to calculate the received uplink signal quality information based on the uplink pilot signal received from the each mobile station, the base station calculates, as the received uplink signal quality information, at least one of a received signal power in the base station for the each mobile station and a ratio of the received signal power to an interference power in the base station for the each mobile station.

7. The received signal quality display method according to claim 1, wherein at the step of causing the each mobile station to transmit the uplink pilot signal and the position information to the base station, the each mobile station transmits the uplink pilot signal and the position information to the base station using a plurality of transmitting antennas based on a multiple-input/multiple-output transmission technique, at the step of causing the base station to receive the uplink pilot signal and the position information from the each mobile station, the base station receives the uplink pilot signal and the position information using a plurality of receiving antennas based on the multiple-input/multiple-output transmission technique, and the uplink pilot signal used at the step of causing the base station to calculate the received uplink signal quality information based on the uplink pilot signal received from the each mobile station is a plurality of uplink pilot signals for the each mobile station.

8. The received signal quality display method according to claim 7, wherein at the step of causing the base station to calculate the received uplink signal quality information based on the uplink pilot signals received from the each mobile station, the base station calculates, as the received uplink signal quality information, at least one of the received signal power in the base station for the each mobile station, the ratio of the received signal power to the interference power in the base station for the each mobile station, a value calculated based on propagation path correlations among the each mobile station and the mobile stations other than the each mobile station for the each mobile station, and correlations among the transmitting antennas in the each mobile station.

9. The received signal quality display method according to claim 7, wherein at the step of causing the base station to calculate the received uplink signal quality information based on the uplink pilot signals received from the each mobile station, the base station calculates, as the received uplink signal quality information, the received signal power in the base station for the each mobile station or the ratio of the received signal power to the interference power in the base station for the each mobile station, and correlations among the plurality of mobile stations, the method further comprises a step of causing the base station to generate improvement location information for notifying one of the mobile stations in which the received signal power or the ratio of the received signal power to the interference power is relatively low as compared with the mobile stations other than the one mobile station, of a location at which the correlation is improved based on the quality-position correspondence information, and at the step of causing the each mobile station to display the image generated based on the quality-position correspondence information, the each mobile station displays, as the image, an image representing the improvement location information.

10. The received signal quality display method according to claim 7, wherein at the step of causing the base station to calculate the received uplink signal quality information based on the uplink pilot signals received from the each mobile station, the base station calculates, as the received uplink signal quality information, the received signal power in the base station for the each mobile station or the ratio of the received signal power to the interference power in the base station for the each mobile station, and correlations among the plurality of mobile stations, the method further comprises a step of causing the base station to generate improvement location information for notifying one of the mobile stations in which the received signal power or the ratio of the received signal power to the interference power is relatively low as compared with the mobile stations other than the one mobile station, of a location farthest from the each mobile station in an area in which the received signal power or the ratio of the received signal power to the interference power is equal to or higher than a predetermined value based on the quality-position correspondence information, and at the step of causing the each mobile station to display the image generated based on the quality-position correspondence information, the each mobile station displays, as the image, an image representing the improvement location information.

11. A received signal quality display method comprising steps of:

causing a base station to transmit a downlink pilot signal to each of a plurality of mobile stations;

causing the each mobile station to receive the downlink pilot signal from the base station;

causing the each mobile station to calculate received downlink signal quality information based on the downlink pilot signal received from the base station;

causing the each mobile station to transmit the received downlink signal quality information and position information indicating a position at which the each mobile station is present to the base station;

causing the base station to generate quality-position correspondence information on the plurality of mobile stations by making the received downlink signal quality information received from the each mobile station correspond to the position information received from the each mobile station;

causing the base station to transmit the quality-position correspondence information to the each mobile station; and causing the each mobile station to display an image generated based on the quality-position correspondence information.

12. The received signal quality display method according to claim 11, further comprising a step of:

causing the each mobile station to generate map information on a plurality of positions based on the quality-position correspondence information, the map information representing a correspondence between each of the plurality of positions and the received downlink signal quality, wherein at the step of causing the each mobile station to display the image generated based on the quality-position correspondence information, the each mobile station displays, as the image, an image representing the map information.

13. The received signal quality display method according to claim 11, further comprising a step of:

causing the each mobile station to generate map information on a position indicated by the position information included in the quality-position correspondence information at each of a plurality of times, the map information representing a correspondence between the position and the received downlink signal quality, wherein at the step of causing the each mobile station to display the image generated based on the quality-position correspondence information, the each mobile station displays, as the image, an image representing the map information.

14. The received signal quality display method according to claim 11, further comprising a step of:

causing the each mobile station to generate proximate location information indicating a most proximate location to a present position among locations at which a received downlink signal quality represented by the received downlink signal quality information exceeds a predetermined quality, based on the quality-position correspondence information, wherein at the step of causing the each mobile station to display the image generated based on the quality-position correspondence information, the each mobile station displays, as the image, an image representing the proximate location information.

15. The received signal quality display method according to claim 11, wherein at the step of causing the each mobile station to calculate the received downlink signal quality information based on the downlink pilot signal received from the base station, the each mobile station calculates, as the received downlink signal quality information, at least one of a received signal power in the each mobile station for the each mobile station and a ratio of the received signal power to an interference power in the each mobile station for the each mobile station.

16. The received signal quality display method according to claim 11, wherein at the step of causing the base station to transmit the downlink pilot signal to the each mobile station, the base station transmits the downlink pilot signal to the each mobile station using a plurality of transmitting antennas based on a multiple-input/multiple-output transmission technique, at the step of causing the each mobile station to receive the downlink pilot signal from the base station, the each mobile station receives the downlink pilot signal using a plurality of receiving antennas based on the multiple-input/multiple-output transmission technique, and the downlink pilot signal used at the step of causing the each mobile station to calculate the received downlink signal quality information based on the downlink pilot signal received from the base station is a plurality of downlink pilot signals.

17. The received signal quality display method according to claim 16, wherein at the step of causing the each mobile station to calculate the received downlink signal quality information based on the downlink pilot signals received from the base station, the each mobile station calculates, as the received downlink signal quality information, at least one of the received signal power in the each mobile station for the each mobile station, the ratio of the received signal power to the interference power in the each mobile station for the each mobile station, and correlations among the transmitting antennas in the base station.

18. The received signal quality display method according to claim 16, wherein at the step of causing the each mobile station to calculate the received downlink signal quality information based on the downlink pilot signals received from the base station, the each mobile station calculates, as the received downlink signal quality information, the received signal power in the each mobile station for the each mobile station or the ratio of the received signal power to the interference power in the each mobile station for the each mobile station, and correlations among the plurality of mobile stations, the method further comprises a step of causing the base station to generate improvement location information for notifying one of the mobile stations in which the received signal power or the ratio of the received signal power to the interference power is relatively low as compared with the mobile stations other than the one mobile station, of a location at which the correlation is improved based on the quality-position correspondence information, and at the step of causing the each mobile station to display the image generated based on the quality-position correspondence information, the each mobile station displays, as the image, an image representing the improvement location information.

19. The received signal quality display method according to claim 16, wherein at the step of causing the each mobile station to calculate the received downlink signal quality information based on the downlink pilot signals received from the base station, the each mobile station calculates, as the received downlink signal quality information, the received signal power in the each mobile station for the each mobile station or the ratio of the received signal power to the interference power in the each mobile station for the each mobile station, and correlations among the plurality of mobile stations, the method further comprises a step of causing the base station to generate improvement location information for notifying one of the mobile stations in which the received signal power or the ratio of the received signal power to the interference power is relatively low as compared with the mobile stations other than the one mobile station, of a location farthest from the each mobile station in an area in which the received signal power or the ratio of the received signal power to the interference power is equal to or higher than a predetermined value based on the quality-position correspondence information, and at the step of causing the each mobile station to display the image generated based on the quality-position correspondence information, the each mobile station displays, as the image, an image representing the improvement location information.

20. A received signal quality display system comprising:

means for transmitting an uplink pilot signal and position information that indicates a position at which the each mobile station is present from the each mobile station to a base station;

means for causing the base station to receive the uplink pilot signal and the position information from the each mobile station means for causing the base station to calculate received uplink signal quality information based on the uplink pilot signal received from the each mobile station;

means for causing the base station to generate quality-position correspondence information on the plurality of mobile stations by making the received uplink signal quality information on the each mobile station correspond to the position information received from the each mobile station;

means for transmitting the quality-position correspondence information from the base station to the each mobile station; and means for causing the each mobile station to display an image generated based on the quality-position correspondence information.

21. The received signal quality display system according to claim 20, further comprising:

means for transmitting a mobile station identification number for identifying the each mobile station from the each mobile station to the base station;

means for causing the base station to generate an uplink pilot control signal, in which a correspondence between the each mobile station and a pattern of an uplink pilot signal to be transmitted by the each mobile station is described, based on the mobile station identification number received from the each mobile station; and means for transmitting the uplink pilot control signal from the base station to the each mobile station, wherein the means for transmitting the uplink pilot signal and the position information indicating the position at which the each mobile station is present from the each mobile station to the base station transmits, as the uplink pilot signal, the uplink pilot signal having the pattern designated by the uplink pilot control signal to the base station.

22. The received signal quality display system according to claim 20, further comprising:

means for causing the each mobile station to generate map information on a plurality of positions based on the quality-position correspondence information, the map information representing a correspondence between the position and the received uplink signal quality, wherein the means for causing the each mobile station to display the image generated based on the quality-position correspondence information causes the each mobile station to display, as the image, an image representing the map information.

23. The received signal quality display system according to claim 20, further comprising:

means for causing the each mobile station to generate map information representing a correspondence between a position and the received uplink signal quality for the position indicated by the position information included in the quality-position correspondence information at each of a plurality of times, wherein the means for causing the each mobile station to display the image generated based on the quality-position correspondence information causes the each mobile station to display, as the image, an image representing the map information.

24. The received signal quality display system according to claim 20, further comprising:

means for causing the each mobile station to generate proximate location information indicating a most proximate location to a present position among locations at which a received uplink signal quality represented by the received uplink signal quality information exceeds a predetermined quality, based on the quality-position correspondence information, wherein the means for causing the each mobile station to display the image generated based on the quality-position correspondence information causes the each mobile station to display, as the image, an image representing the proximate location information.

25. The received signal quality display system according to claim 20, wherein the means for causing the base station to calculate the received uplink signal quality information based on the uplink pilot signal received from the each mobile station causes the base station to calculate, as the received uplink signal quality information, at least one of a received signal power in the base station for the each mobile station and a ratio of the received signal power to an interference power in the base station for the each mobile station.

26. The received signal quality display system according to claim 20, wherein the means for causing the each mobile station to transmit the uplink pilot signal and the position information to the base station causes the each mobile station to transmit the uplink pilot signal and the position information to the base station using a plurality of transmitting antennas based on a multiple-input/multiple-output transmission technique, the means for causing the base station to receive the uplink pilot signal and the position information from the each mobile station causes the base station to receive the uplink pilot signal and the position information using a plurality of receiving antennas based on the multiple-input/multiple-output transmission technique, and the uplink pilot signal used by the means for causing the base station to calculate the received uplink signal quality information based on the uplink pilot signal received from the each mobile station is a plurality of uplink pilot signals for the each mobile station.

27. The received signal quality display system according to claim 26, wherein the means for causing the base station to calculate the received uplink signal quality information based on the uplink pilot signals received from the each mobile station causes the base station to calculate, as the received uplink signal quality information, at least one of the received signal power in the base station for the each mobile station, the ratio of the received signal power to the interference power in the base station for the each mobile station, a value calculated based on propagation path correlations among the each mobile station and the mobile stations other than the each mobile station for the each mobile station, and correlations among the transmitting antennas in the each mobile station.

28. The received signal quality display system according to claim 26, wherein the means for causing the base station to calculate the received uplink signal quality information based on the uplink pilot signals received from the each mobile station causes the base station to calculate, as the received uplink signal quality information, the received signal power in the base station for the each mobile station or the ratio of the received signal power to the interference power in the base station for the each mobile station, and correlations among the plurality of mobile stations, the system further comprises means for causing the base station to generate improvement location information for notifying one of the mobile stations in which the received signal power or the ratio of the received signal power to the interference power is relatively low as compared with the mobile stations other than the one mobile station, of a location at which the correlation is improved based on the quality-position correspondence information, and the means for causing the each mobile station to display the image generated based on the quality-position correspondence information causes the each mobile station to display, as the image, an image representing the improvement location information.

29. The received signal quality display system according to claim 26, wherein the means for causing the base station to calculate the received uplink signal quality information based on the uplink pilot signals received from the each mobile station causes the base station to calculate, as the received uplink signal quality information, the received signal power in the base station for the each mobile station or the ratio of the received signal power to the interference power in the base station for the each mobile station, and correlations among the plurality of mobile stations, the system further comprises means for causing the base station to generate improvement location information for notifying one of the mobile stations in which the received signal power or the ratio of the received signal power to the interference power is relatively low as compared with the mobile stations other than the one mobile station, of a location farthest from the each mobile station in an area in which the received signal power or the ratio of the received signal power to the interference power is equal to or higher than a predetermined value based on the quality-position correspondence information, and the means for causing the each mobile station to display the image generated based on the quality-position correspondence information causes the each mobile station to display, as the image, an image representing the improvement location information.

30. A received signal quality display system comprising:

means for transmitting a downlink pilot signal from a base station to each of a plurality of mobile stations;

means for causing the each mobile station to receive the downlink pilot signal from the base station;

means for causing the each mobile station to calculate received downlink signal quality information based on the downlink pilot signal received from the base station;

means for transmitting the received downlink signal quality information and position information indicating a position at which the each mobile station is present from the each mobile station to the base station;

means for causing the base station to generate quality-position correspondence information on the plurality of mobile stations by making the received downlink signal quality information received from the each mobile station correspond to the position information received from the each mobile station;

means for transmitting the quality-position correspondence information from the base station to the each mobile station; and means for causing the each mobile station to display an image generated based on the quality-position correspondence information.

31. The received signal quality display system according to claim 30, further comprising:

means for causing the each mobile station to generate map information on a plurality of positions based on the quality-position correspondence information, the map information representing a correspondence between each of the plurality of positions and the received downlink signal quality, wherein the means for causing the each mobile station to display the image generated based on the quality-position correspondence information causes the each mobile station to display, as the image, an image representing the map information.

32. The received signal quality display system according to claim 30, further comprising:

means for causing the each mobile station to generate map information on a position indicated by the position information included in the quality-position correspondence information at each of a plurality of times, the map information representing a correspondence between the position and the received downlink signal quality, wherein the means for causing the each mobile station to display the image generated based on the quality-position correspondence information causes the each mobile station to display, as the image, an image representing the map information.

33. The received signal quality display system according to claim 30, further comprising:
means for causing the each mobile station to generate proximate location information indicating a most proximate location to a present position among locations at which a received downlink signal quality represented by the received downlink signal quality information exceeds a predetermined quality, based on the quality-position correspondence information, wherein
the means for causing the each mobile station to display the image generated based on the quality-position correspondence information causes the each mobile station to display, as the image, an image representing the proximate location information.

34. The received signal quality display system according to claim 30, wherein
the means for causing the each mobile station to calculate the received downlink signal quality information based on the downlink pilot signal received from the base station causes the each mobile station to calculate, as the received downlink signal quality information, at least one of a received signal power in the each mobile station for the each mobile station and a ratio of the received signal power to an interference power in the each mobile station for the each mobile station.

35. The received signal quality display system according to claim 30, wherein
the means for causing the base station to transmit the downlink pilot signal to the each mobile station causes the base station to transmit the downlink pilot signal to the each mobile station using a plurality of transmitting antennas based on a multiple-input/multiple-output transmission technique,
the means for causing the each mobile station to receive the downlink pilot signal from the base station causes the each mobile station to receive the downlink pilot signal using a plurality of receiving antennas based on the multiple-input/multiple-output transmission technique, and
the downlink pilot signal used by the means for causing the each mobile station to calculate the received downlink signal quality information based on the downlink pilot signal received from the base station is a plurality of downlink pilot signals.

36. The received signal quality display system according to claim 35, wherein
the means for causing the each mobile station to calculate the received downlink signal quality information based on the downlink pilot signals received from the base station causes the each mobile station to calculate, as the received downlink signal quality information, at least one of the received signal power in the each mobile station for the each mobile station, the ratio of the received signal power to the interference power in the each mobile station for the each mobile station, and correlations among the transmitting antennas in the base station.

37. The received signal quality display system according to claim 35, wherein
the means for causing the each mobile station to calculate the received downlink signal quality information based on the downlink pilot signals received from the base station causes the each mobile station to calculate, as the received downlink signal quality information, the received signal power in the each mobile station for the each mobile station or the ratio of the received signal power to the interference power in the each mobile station for the each mobile station, and correlations among the plurality of mobile stations,
the system further comprises means for causing the base station to generate improvement location information for notifying one of the mobile stations in which the received signal power or the ratio of the received signal power to the interference power is relatively low as compared with the mobile stations other than the one mobile station, of a location at which the correlation is improved based on the quality-position correspondence information, and
the means for causing the each mobile station to display the image generated based on the quality-position correspondence information causes the each mobile station to display, as the image, an image representing the improvement location information.

38. The received signal quality display system according to claim 35, wherein
the means for causing the each mobile station to calculate the received downlink signal quality information based on the downlink pilot signals received from the base station causes the each mobile station to calculate, as the received downlink signal quality information, the received signal power in the each mobile station for the each mobile station or the ratio of the received signal power to the interference power in the each mobile station for the each mobile station, and correlations among the plurality of mobile stations,
the system further comprises means for causing the base station to generate improvement location information for notifying one of the mobile stations in which the received signal power or the ratio of the received signal power to the interference power is relatively low as compared with the mobile stations other than the one mobile station, of a location farthest from the each mobile station in an area in which the received signal power or the ratio of the received signal power to the interference power is equal to or higher than a predetermined value based on the quality-position correspondence information, and
the means for causing the each mobile station to display the image generated based on the quality-position correspondence information causes the each mobile station to display, as the image, an image representing the improvement location information.

* * * * *